United States Patent [19]
Takaki et al.

[11] Patent Number: 6,081,090
[45] Date of Patent: Jun. 27, 2000

[54] SERVO SYSTEM CONTROLLER

[75] Inventors: Nobuyasu Takaki; Misako Okada, both of Nagoya, Japan

[73] Assignee: Mitsubishi Denki Kabushiki Kaisha, Tokyo, Japan

[21] Appl. No.: 09/276,656

[22] Filed: Mar. 26, 1999

[30] Foreign Application Priority Data

May 28, 1998 [JP] Japan ................................. 10-147335

[51] Int. Cl.$^7$ ................................................. G05B 19/10
[52] U.S. Cl. ......................... 318/567; 318/560; 318/569; 318/600
[58] Field of Search .................................. 318/567, 560, 318/568.1, 568.22, 569, 600; 364/476; 395/876

[56] References Cited

U.S. PATENT DOCUMENTS 5,229,952  7/1993  Galloway et al. ...................... 364/476
5,864,568  1/1999  Namazie .................................. 395/876

FOREIGN PATENT DOCUMENTS 2-146606  6/1990  Japan .

*Primary Examiner*—Karen Masih
*Attorney, Agent, or Firm*—Sughrue, Mion, Zinn, Macpeak & Seas, PLLC

[57] ABSTRACT

In a servo system controller comprising a servo control section, a sequence control section, and a dual port memory, an event detecting unit for detecting generation of an event according to input information from an object to be controlled and an event processing program memory are provided in the servo control section, and an event processing program is executed by the event processing program memory upon interruption by the servo control section according to an output signal from the event detecting unit.

22 Claims, 18 Drawing Sheets

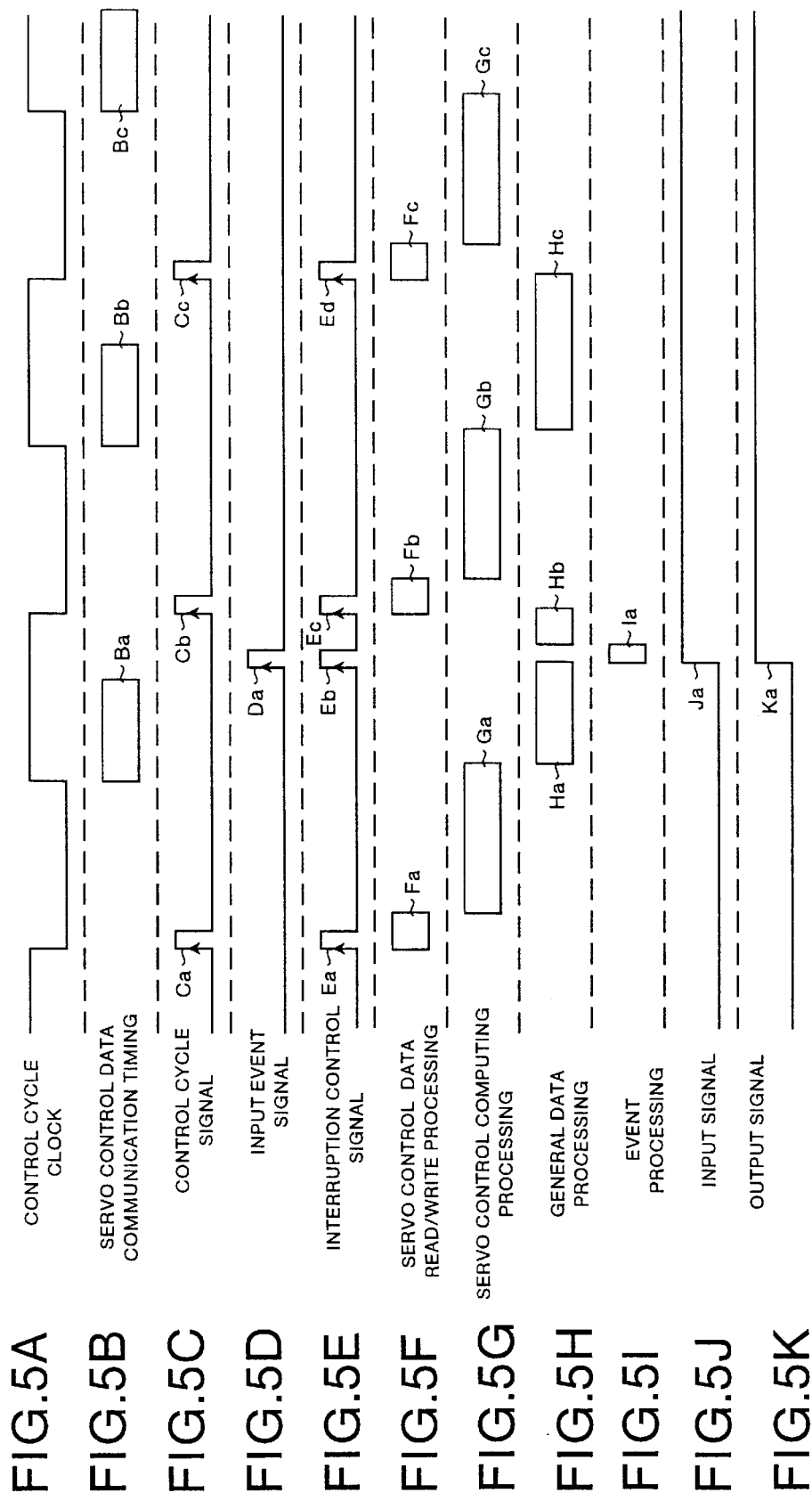

ABS—2
AXIS 1, 10000
AXIS 2, 20000
SPEED 100

CANCEL K100
START K200

ABS—2
AXIS 1, 20000
AXIS 2, 40000
SPEED 200

FIG.7

| | EVENT FACTOR | PROGRAM NUMBER | |
|---|---|---|---|
| EVENT 1 INFORMATION | PX0 | 100 | $26_1$ |
| EVENT 2 INFORMATION | PX1 | 110 | $26_2$ |
| EVENT 3 INFORMATION | PX2 | 120 | $26_3$ |
| EVENT 4 INFORMATION | PX3 | 130 | $26_4$ |
| EVENT 5 INFORMATION | PX4 | 140 | $26_5$ |

FIG.13

| | EVENT FACTOR | PROGRAM NUMBER |
|---|---|---|
| EVENT 1 INFORMATION | TIMER | 200 |

| | EVENT FACTOR | PROGRAM NUMBER |
|---|---|---|
| EVENT 1 INFORMATION | CONTROL CYCLE | 300 |

SERVO SYSTEM CONTROLLER

FIELD OF THE INVENTION

The present invention relates to a controller for machine control for controlling a machining device, and more particularly to a servo system controller having a sequence control section and a servo control section and controlling a servo system.

BACKGROUND OF THE INVENTION

In a system for controlling an object to be controlled such as a machining device using a servo motor with a servo system controller having a sequence control section and a servo control section, when providing controls such as changing an operation pattern of the servo motor or an output signal to the object to be controlled in response to an event to the object to be controlled according to an input signal from outside or a fixed cycle event instructed by a timer in the sequence control section, a response time from detection of the event up to change of the operation pattern of the servo motor or change of the output signal, give basic influence over a tact time, and nonuniformity of the response time affect the machining precision. Especially, when it is necessary to raise the machining speed for shortening the tact time, the influence becomes remarkable, and for this reason it is strongly required to shorten and stabilize the response time.

FIG. 24 shows a conventional type of servo system controller having a sequence control section and a servo control section disclosed in Japanese Patent Laid-Open Publication No. HEI 2-146606. In FIG. 24, the reference numeral 1 indicates a basic body of the servo system controller, and the basic body 1 of the servo system controller has a sequence control section 2 and a servo control section 3.

The sequence control section 2 comprises a CPU 4 for sequence control, a control memory 5, an I/O interface 6, and an interface 7 for peripheral devices. An input unit 8 and an output unit 9, each as an object to be controlled, are connected to the I/O interface 6. The servo control section 3 comprises a CPU 10 for positioning control, a control memory 11, a servo program memory 12, and a servo interface 14. A servo system 21 including a servo motor is connected to the servo interface 14. The basic body 1 of the servo system controller has a common memory 100 comprising, for instance, a dual-port memory for delivery of information between the sequence control section 2 and the servo control section 3 as a memory shared by the sequence control section 2 and the servo control section 3.

As shown in FIG. 25, the common memory 100 has a device information area 100a, a starting area 100b, and a monitor area 100c.

Next description is made for operations. The CPU 4 for sequence control in the sequence control section 2 receives input information from an object to be controlled (not shown) via the I/O interface 6 from the input unit 8, scans and executes a sequence program in which input information, internal information and output information to the object to be controlled are described with parameters such as device names and register numbers, and outputs output information via the I/O interface 6 to the output unit 9 by repeating operations for updating the output information and internal information for providing sequence controls over the object to be controlled.

The sequence control section 2 writes a value for specified device information in the device information area 100a in the common memory 100 by executing the sequence program and also writes specified start information in the starting area 100b. The servo control section 3 monitors the starting area 100b in the common memory 100, reads, when specified start information is written in the starting area 100b, a value of the device information from the device information area 100a, executes a servo program stored in the servo program memory 12 according to the information, and provides positioning controls for the servo system 21 via the servo interface 14. If the start information written in the starting area 100b is information for starting execution of a servo program, the servo control section 3 starts execution of a specified servo program stored in the servo program memory 12 according to the device information written in the device information area 100a in the common memory 100.

The servo control memory 3 monitors device information for stopping a positioning operation in the device information area 100a in the common memory 100, and stops a servo motor in servo system 21, when information for instructing stop of a positioning operation is written, even if positioning control by the servo program has not completely been executed, and then terminates the positioning control. When the start information written in the starting area 100b in the common memory 100 is information for changing a positioning speed, the servo control section 3 changes the positioning speed according to the device information written in the device information area 100a, and restarts and continues execution of positioning control by the servo program in execution.

If the start information written in the starting area 100b in the common memory 100 is information for changing a torque limit value for a servo motor in the servo system 21, the servo control section 3 changes a torque limit value according to the device information written in the device information area 100a, and restarts and continues execution of positioning control by the servo program in execution. If the started servo program is for position-tracking control, the servo control section 3 refers to the device information area 100a in the common memory 100 once for every cycle for servo control, computes a target position according to the device information written in the sequence control section 2, and provides positioning controls for the servo system 21.

When the started servo program is for providing cancel/start controls, the servo control section 3 monitors device information for cancel instruction in the device information area 100a in the common memory 100, and interrupts, execution of the servo program when information is found instructing canceling of the program in execution, and starts execution of a servo program instructed to be started. When positioning is complete, the servo control section 3 stores information indicating completion in a monitor area 100a in the common memory 100. Also, during execution of positioning, data or error information is stored from time to time in the monitor area 100c.

It should be noted that the control memories 5, 11 are used for running the CPUs 4 and 10 respectively. A sequence program written via the interface 7 for peripheral devices from a peripheral device, is stored in the control memory 5, and a servo program written via the interface 7, for peripheral devices from a peripheral device, is stored in the servo program memory 12.

As described above, detection of an event in an object to be controlled is executed by scanning and executing a sequence program by the sequence control section 2.

In the servo system controller as described above, there occur problems (1) to (9) described below.

(1) As detection of an event in an object to be controlled is always executed by scanning and executing a sequence program with a sequence control section, it is necessary to shorten a scan time in the sequence control section for shortening a response time for detection of an event in the object to be controlled, thus a high performance CPU must be used, which results in cost increase.

(2) Events detected as input information from an object to be controlled include not only those to be responded at a high speed, but also those which may be responded at a low speed. However, in the conventional type of servo system controller, all events are detected by scanning and executing a sequence program in the sequence control section, so that it is impossible to provide controls at an optimal response speed according to control characteristics for each event.

(3) It is difficult to independently describe a control program according to control characteristics of each event to be detected as input information from the object to be controlled, so that the control program is difficult to understand.

(4) Time delay for scan time in the sequence control section is generated from a point of time when an event in an object to be controlled is detected in response to input information to the sequence control section up to a point of time when execution of a servo program is started in the servo control section, which prevents a tact time from being shortened.

(5) During execution of a positioning operation according to a servo program in a servo control section, delay for scan time in a sequence control section and nonuniformity are generated until an event in an object to be controlled is generated and a positioning speed is changed, so that compatibility between shortening of a tact time and improvement of the machining precision is difficult.

(6) During execution of a positioning operation according to a servo program in a servo control section, delay for scan time in a sequence control section and nonuniformity are generated until an event in an object to be controlled is generated and a torque limit value is changed, so that compatibility between shortening of a tact time and improvement of the machining precision is difficult.

(7) When a servo program currently being executed is interrupted in the servo control section upon detection of an event in an object to be controlled and cancel/start control for starting another specified servo program is provided, time delay for a scan time in the sequence control section and nonuniformity are generated, so that compatibility between shortening of a tact time and improvement of the machining precision is difficult.

(8) Even if it is necessary to periodically refer to input information from an object to be controlled at a specified cycle, information is referred to by scanning and executing a sequence program in the sequence control section, so that it is difficult to periodically refer to input information at an optimal cycle according to control characteristics of each input information.

(9) When position-tracking control is executed in a servo control section, so that a positioning address is corrected according to a result of computing in a sequence control section, control with time resolution shorter than the scan time in the sequence control section can not be executed. Furthermore, as a scan cycle in the sequence control section is asynchronous to a control cycle in the servo control section, at what timing a result of computing is reflected to the servo control can not be identified, so that high precision machining at a high speed can not be executed.

SUMMARY OF THE INVENTION

It is an object of the present invention to obtain a servo system controller which can shorten, without causing cost increase, a response time to detection of an event in an object to be controlled and enables both shortening of a tact time and improvement of the machining precision. This is accomplished by controlling the object to be controlled with a fixed response time according to control characteristics of each event. Furthermore, both shortening of a tact time and improvement of the machining precision is provided by shortening and keeping constant a response time when starting a servo program upon detection of an event, when changing a torque limit value during execution of the processing, or when providing cancel/start controls. Additionally, understanding a control program is made easier by independently describing the control program according to control characteristics of each event and suppressing a CPU occupying ratio of the servo control section for event processing to a prespecified value or less so that execution of event processing program will not affect servo control. This also can reflect a result of computing with arithmetic functions or the like, when executing position-tracking control, to servo control at a timing synchronized to a servo control cycle and enables high speed and high precision machining.

With the servo system controller according to the present invention, an event detecting unit provided in the servo control section detects generation of an event in response to input information from an object to be controlled, and executes an event processing program stored in an event processing program memory in a servo control section upon interruption by the servo control section according to an output signal from the event detecting unit.

With the servo system controller according to the present invention, an event detecting unit in the servo control section detects generation of a fixed cycle event according to a timer signal outputted from a fixed cycle timer, and executes an event processing program stored in an event processing program memory in the servo control section upon interruption by the servo control section in response to an output signal from the event detecting unit.

With the servo system controller according to the present invention, an event processing program, stored in an event processing program memory, is executed upon interruption by the servo control section at a fixed cycle synchronized to that of the servo control, according to information of a control cycle clocks in the servo control section.

Other objects and features of this invention will become apparent from the following description with reference to the accompanying drawings.

BRIEF DESCRIPTION OF THE DRAWINGS

FIGS. 5A to 5K are timing charts for execution of event processing in the servo system controller in Embodiment 1;

FIGS. 6A to 6C are explanatory views showing an example of a servo program for a servo system controller;

FIG. 7 is an explanatory view showing an example of event processing parameter setting;

FIG. 13 is an explanatory view showing an example of event processing parameter setting;

DETAILED DESCRIPTION OF THE DRAWINGS

Figure 1:
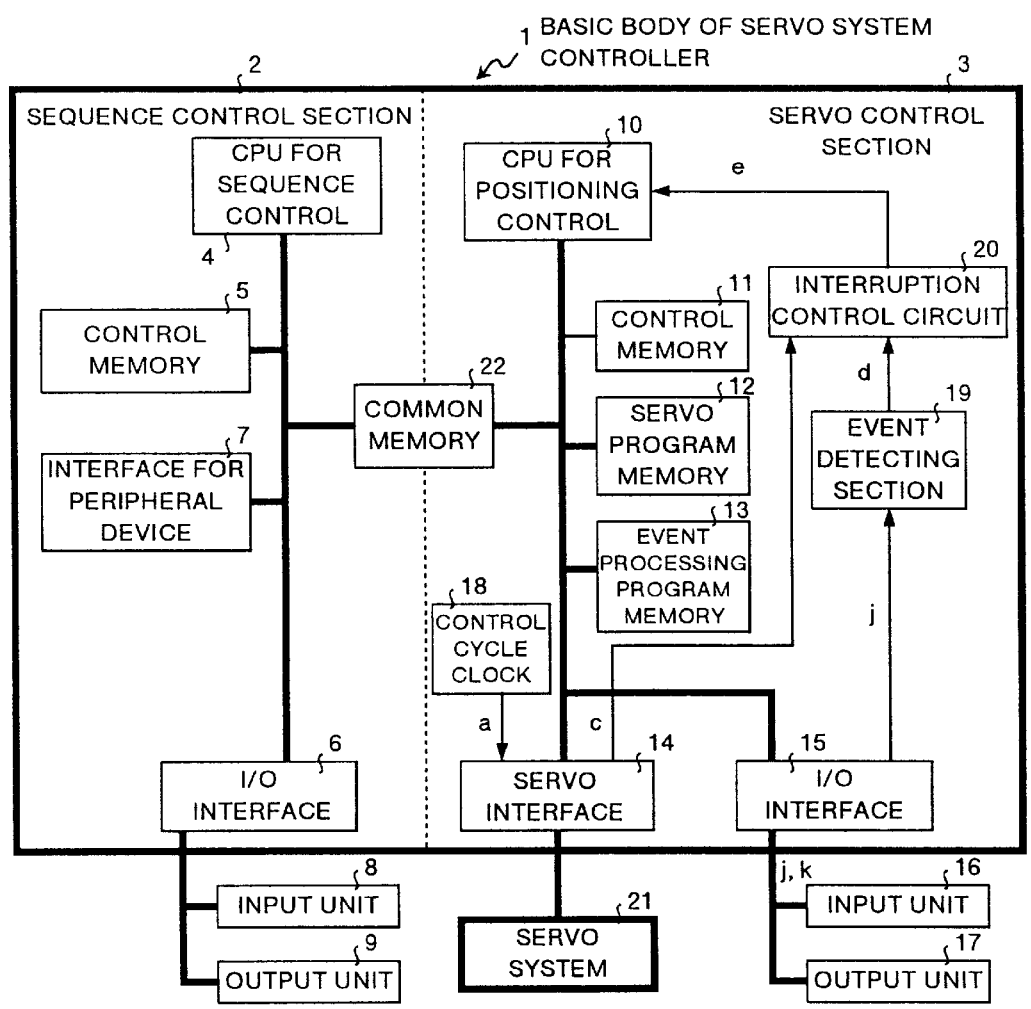
FIG. 1 is a block diagram showing Embodiment 1 of a servo system controller according to the present invention.

Next, detailed description is made for embodiments of the present invention with reference to attached drawings. It should be noted that the same reference numerals as those used in description of the example of prior art described above are assigned to the same components as those in the example of prior art and description thereof is omitted herein.

FIG. 1 shows configuration of Embodiment 1 of the servo system controller (described as SSC hereinafter) according to the present invention. In the SSC according to the present invention, in addition to the CPU 10 for positioning control, control memory 11, servo program memory 12, and servo interface 14, an event processing program memory 13, an I/O interface 15 with an input unit 16 and an output unit 17 each as an object to be controlled connected thereto, and a control cycle clock 18, an event detecting section 19, and an interruption control circuit 20 are added to the servo control section 3.

The control cycle clock 18 gives a control cycle clock signal to the servo interface 14, and the servo interface 14 generates a trigger-form control cycle signal synchronized to a falling edge of the control cycle clock signal and gives the trigger-form control cycle signal to the interruption control circuit 20. The event detecting section 19 detects generation of an event according to input information from an object to be controlled. The input signal indicating generation of an event is given from the input unit 16 via the interface 15 to the event detecting section, and the event detecting section 19 generates a pulse in an input event signal according to the input signal.

The interruption control circuit 20 gives, when it receives a control cycle signal from the servo interface 14, an interruption control signal for reading or writing servo control data from or in the CPU 10 for positioning control. Also, the interruption control circuit 20 receives an input event signal from the event detecting section 19, and gives an interruption control signal for event processing to the CPU 10 for positioning control in synchronism to a rising transition edge of the input event signal.

With this operation, the event processing program is executed upon only interruption by the servo control section 3. The event processing by this event processing program includes updating of output information to an object to be controlled, start of execution of a positioning program, changing of a positioning speed during execution of the processing, changing of a torque limit value for a servo motor during execution of the processing, and start of execution of a positioning program specified after termination of execution of the positioning program currently in execution. The servo control section 3 can execute a step or steps in a particular range of an event processing program described in a form of SFC (Sequential Function Chart) only once by interrupting once.

It should be noted that the sequence control section 2 comprises the CPU 4 for sequence control, control memory 5, I/O interface 6, and interface 7 for peripheral devices.

The basic body 1 of the SSC has a common memory 22 comprising, for instance, a dual-port memory for delivery of information between the sequence control section 2 and the servo control section 3 as a memory shared by the sequence control section 2 and servo control section 3.

Figure 2:
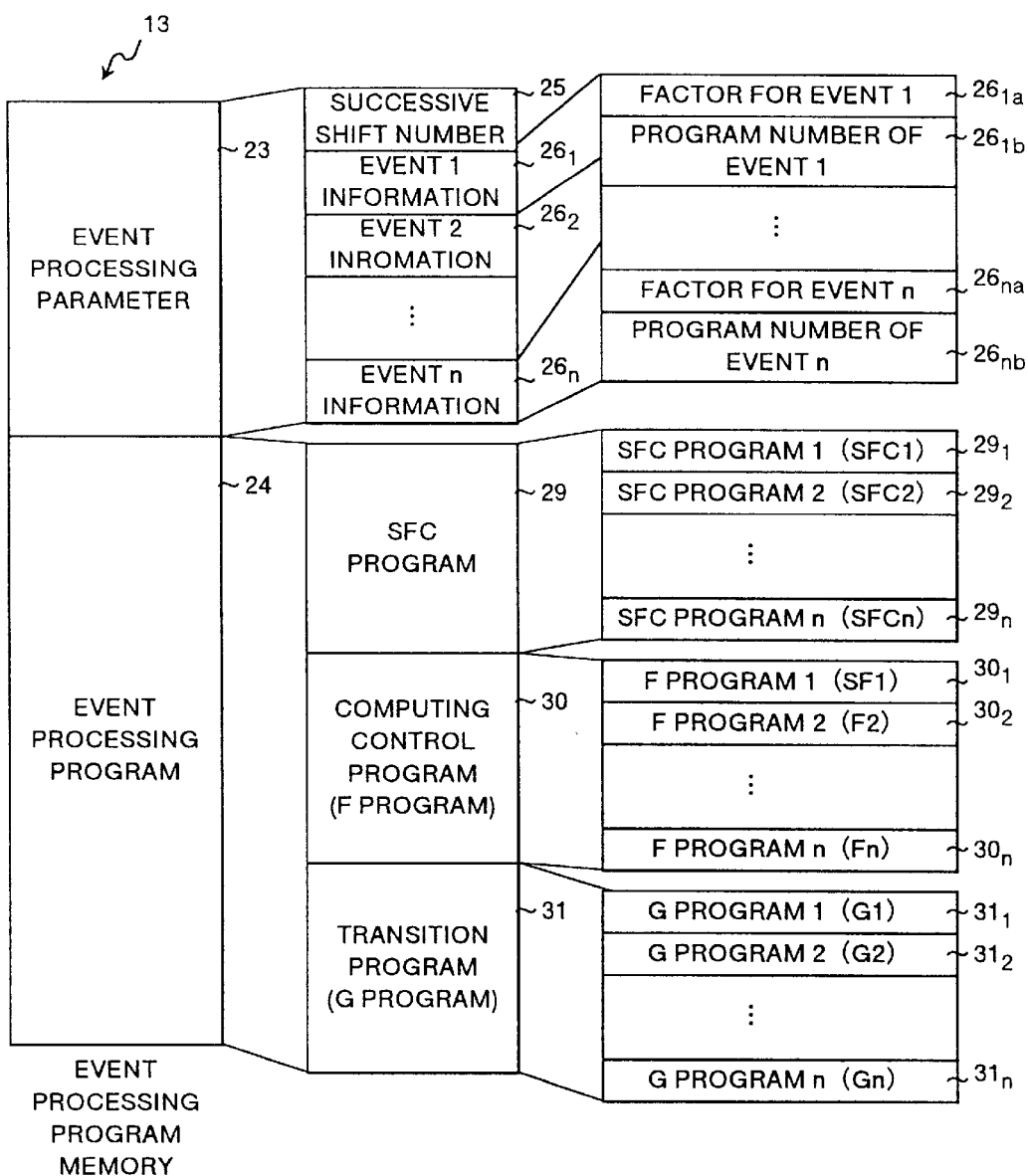
FIG. 2 is a memory block diagram for an event processing program memory in the servo system controller according to the present invention.

FIG. 2 shows an example of memory configuration in the event processing program memory 13. The event processing program memory 13 has an event processing parameter storage area 23 and an event processing program storage area 24 each specified therein. The event processing parameter storage area 23 comprises a successive shift number storage area 25 for storing therein a successive shift number for limiting a range of a step or steps in the SFC program executed in one event processing, and event 1 information storage area $26_1$ to event n information storage area $26_n$.

The event 1 information storage area $26_1$ to event n information storage area $26_n$ have event factor storage areas $26_{1a}$ to $26_{na}$ each for storing therein a factor for each event processing and event program number storage areas $26_{1b}$ to $26_{nb}$ each for storing therein a program number of the SFC program executed in each event as a pair respectively. The event processing program area 24 comprises an SFC program storage area 29, a computing control program (described as F program hereinafter) storage area 30, and a transition program (described as G program hereinafter) storage area 31.

The SFC program storage area 29 comprises an SFC program 1 (described as SFC 1 hereinafter) storage area $29_1$ for storing therein SFC programs having program numbers 1 to n respectively, and SFC 2 storage area $29_2$ to SFC storage area $29_n$. The F program storage area 30 comprises an F1 storage area $30_1$, F2 storage area $30_2$ to Fn program area $30_n$ for storing therein F programs with program numbers 1 to n. The G program storage area 31 comprises a G1 storage area $31_1$, G2 storage area $31_2$ to Gn storage area $31_n$ for storing therein G programs with program numbers 1 to n.

Figure 3:
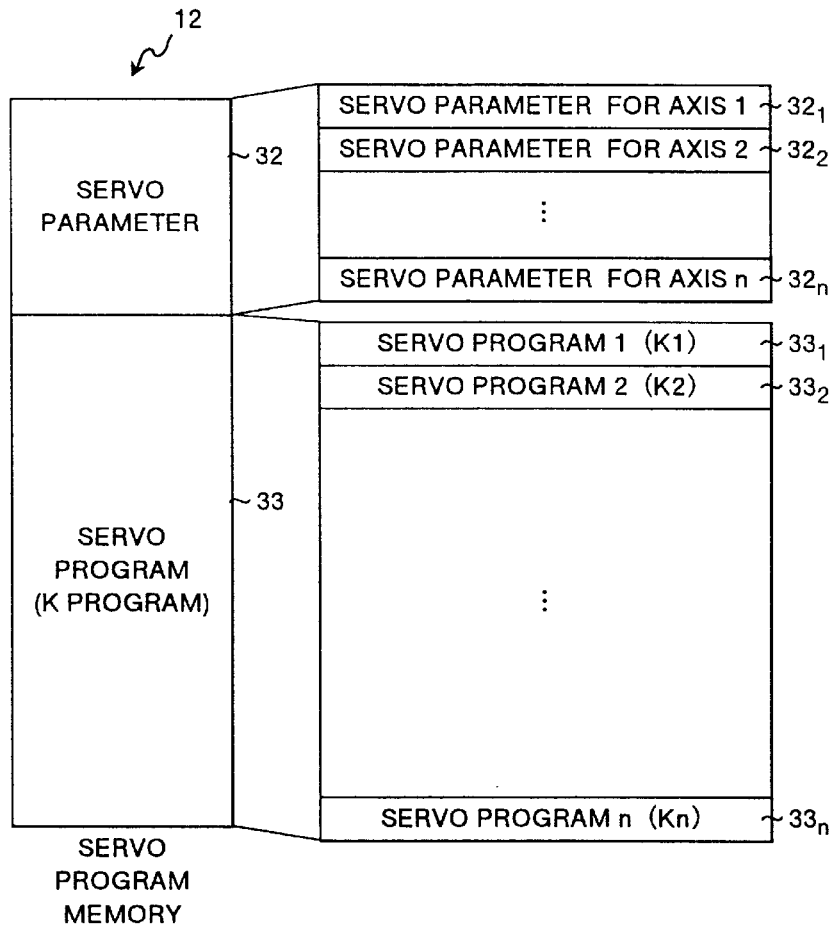
FIG. 3 is a memory block diagram for a servo program memory in the servo system controller according to the present invention.

FIG. 3 shows an example of memory configuration of the servo program memory 12 in FIG. 1. The servo program memory 12 has a servo parameter storage area 32 and a servo program (described as K program hereinafter) storage area 33.

The servo parameter storage area 32 comprises a one-axis servo parameter storage area $32_1$, a two-axis servo parameter storage areas $32_2$ up to n-axis servo parameter storage area $32_n$ for storing therein one-axis to n-axis servo parameters such as a unit system, a type of a servo amplifier, a type of a servo motor respectively. The K program storage area 33 comprises a servo program 1 (described as K1 hereinafter) storage area $33_1$, K2 storage area $33_2$ to Kn storage area $33_n$ for storing therein servo programs with program numbers 1 to n respectively.

Figure 4:
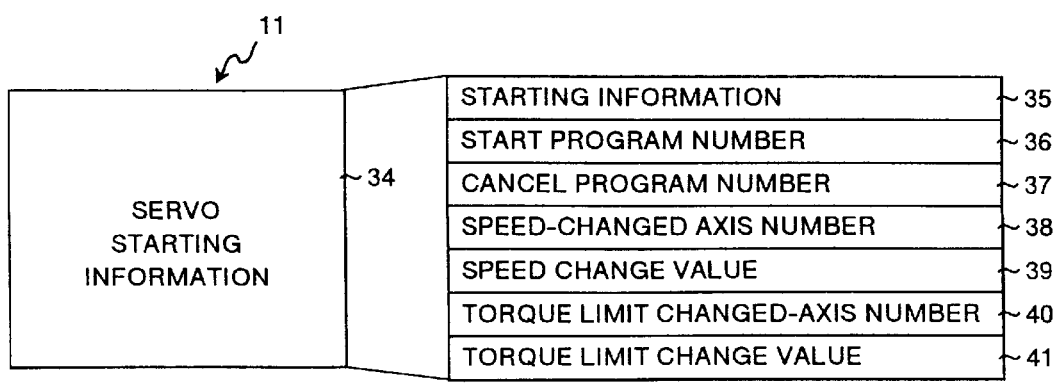
FIG. 4 is a block diagram showing a servo start information storage area in the servo system controller according to the present invention.

FIG. 4 shows a servo start information storage area 34 provided in the control memory 11. The servo start information storage area 34 comprises a start information storage area 35, a start program number area 36, a cancel program number storage area 37, a speed-changed axis number storage area 38, a speed change value storage area 39, a torque limit changed-axis number storage area 40, and a torque limit change value storage area 41.

FIGS. 5A to 5K are timing charts each showing operating timing for the servo control section 3.

FIG. 5A shows a waveform of a control cycle clock signal inputted from the control cycle clock 18 into the servo interface 14.

FIG. 5B shows servo control data communicating timing indicating timing for transaction of servo control data between the servo interface 14 and servo system 21, and Ba, Bb, and indicate servo control data communication timing synchronized to a rising edge of the control cycle clock signal waveform respectively.

FIG. 5C shows a waveform of a control cycle signal inputted from the servo interface 14 to the interruption control circuit 20, and Ca to Cc indicates a rising edge of a control cycle signal synchronized to a falling edge of the control cycle clock signal waveform respectively.

FIG. 5D shows an input event signal waveform generated in the event detecting section 19 in response to an input signal from the I/O interface 15, and Da indicates the first transition edge.

FIG. 5E shows an interruption control signal waveform inputted from the interruption control circuit 20 into the CPU 10 for positioning control, and Ea to Ed each indicate the rising edge. Of these rising edges, Ea, Eb, and Ed are synchronous to rising edges Ca to Cc of control cycle signals respectively, and Eb is synchronous to a rising edge of an input event signal.

FIG. 5F shows processing timing for servo control data read/write processing for the CPU 10 for positioning control to read or write servo control data from or in the servo interface 14, and Fa, Fb, Fc indicate processing timing for servo control data read/write processing executed upon interruption by the CPU 10 for positioning control generated at the rising edges Ea, Ec, and Ed of interruption control signals each according to a control cycle signal respectively.

FIG. 5G shows processing timing for servo computing processing for servo control such as computing for acceleration or deceleration or computing for interpolation for a plurality of axes. The servo control computing processing is started as a real time task when execution of the servo control data read/write processing is finished. Ga, Gb, and Gc indicate processing timing started by the servo control data read/write processing Fa, Fb, and Fc respectively.

FIG. 5H shows processing timing for general data processing for executing processing with a lower priority as compared to the real time processing for servo control such as setting monitor data not required to be refreshed at a high speed in the common memory 22 or communication with a peripheral device via the interface 7 for peripheral device and the common memory 22, and Ha to Hc indicates timing of processing executed when the CPU 10 for positioning control for processing with a higher priority order is empty.

FIG. 5I shows timing of event processing, and Ia indicates timing for event processing executed in response to interruption by the CPU 10 for positioning control generated at a rising edge of the interruption control signal Eb according to an input event signal.

FIG. 5J shows a waveform of an input signal inputted as a trigger for event processing from an external object to be controlled via the input unit 16, and Ja indicates the rising edge.

FIG. 5K shows a waveform of an output signal updated in event processing and outputted from the output unit 17 to an external object to be controlled, and Ka indicates the rising edge.

Next description is made for operations of the sequence control section 2. The sequence control program is previously stored by a user via the interface 7 for peripheral devices in the control memory 5. The CPU 14 for sequence control in the sequence control section 2 fetches input information from the input unit 8 connected to an object to be controlled via the I/O interface 6, scans and executes a sequence program, and provides sequence control for the object to be controlled with the output unit 9 via the I/O interface 6.

Device information such as input information, output information, and internal information updated in sequence processing is stored in the common memory 22. Also positioning information used for servo control is stored in the common memory 22. For this reason, the servo control section 3 can apply a result of computing in the sequence control section 2 to servo control by referring to the device information stored in the common memory 22. Also the sequence control section 2 can monitor data in the servo control section 3 such as a current value, a rotational speed, or an operating state by accessing particular device information in the common memory 22.

Next description is made for operations of the servo control section 3. The servo program and the event processing program are previously stored by a user in the servo program memory 12 and in the event processing program memory 13 via the I/O interface 6 and common memory 22 respectively. Herein, examples of the servo program to be stored are shown in FIG. 6A to FIG. 6C. FIG. 6A shows a program K100 with program number 100, FIG. 6B shows a program K130, and FIG. 6C shows a program K200, and the programs are stored at areas for corresponding program numbers in the K program area 33 in the servo program memory 12 respectively.

The program K100 is a servo program based on the absolute system for providing linear interpolation controls over the axis 1 and axis 2, and provides 2-axis linear interpolation with a synthesized speed 100 so that the axis 1 is positioned at address 10000 and the axis 2 at address 20000. The program K130 is a servo program for canceling or starting which terminates execution of the program K100 and starts execution of the program K200. The program K200 is a servo program based on the absolute system for providing linear interpolation controls over the axis 1 and axis 2, and provides 2-axis linear interpolation controls with a synthesized speed 200 so that the axis 1 is positioned at address 20000 and axis 2 at address 40000.

An example of event processing parameter setting is shown in FIG. 7. Event 1 information (event factor, program number) to event 5 information (event factor, program number) are stored in corresponding areas of event 1 information storage area $26_1$ to event n information storage area $26_n$ of the event processing parameter storage area 23 in the event processing program memory 13. The event 1 information indicates setting for starting an SFC program (SFC 100) with program number 100 at a rising edge of PX0. Herein, PX0 indicates an input signal from the input unit 16 connected to the servo control section 3 with a parameter name, and this parameter name is differentiated from an input signal X0 from the input unit 8 connected to the sequence control section 2 by adding P at its header. In this example of parameter setting, a successive shift number of 2 is stored in the successive shift number storage area 25.

Figure 8A:
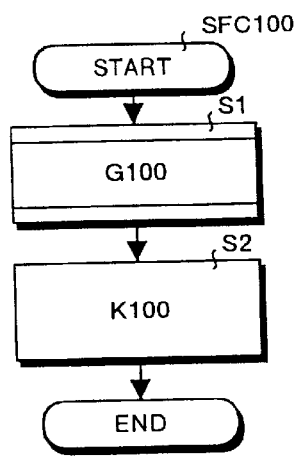
FIGS. 8A to 8E are explanatory views showing an example of SFC program setting.
Figure 8D:
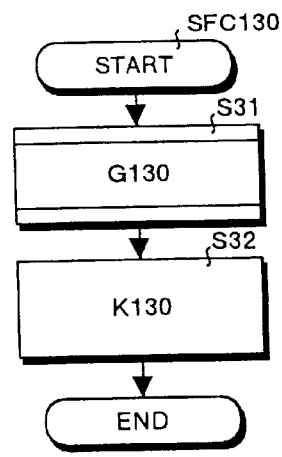
Figure 8B:
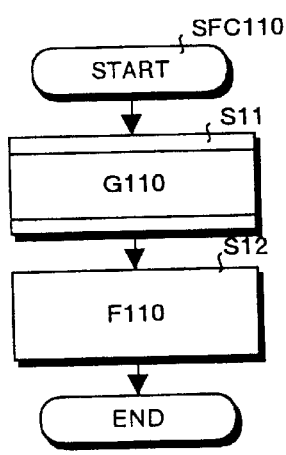
Figure 8E:
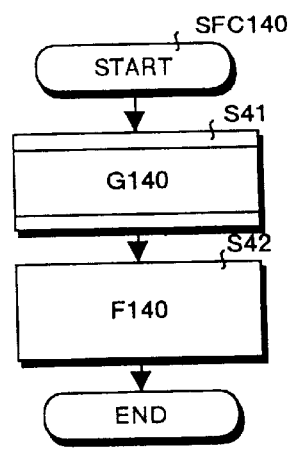
Figure 8C:
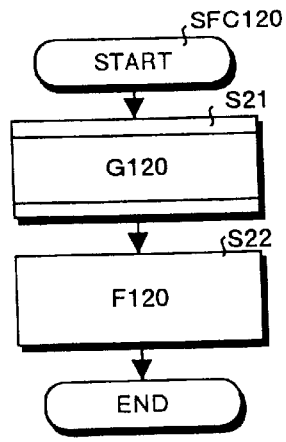

Example of setting of an SFC program are shown in FIG. 8A to FIG. 8C. FIG. 8A shows a program SFC 100 with program number 100, FIG. 8B shows a program SFC 110, FIG. 8C shows a program SFC 120, FIG. 8D shows a program SFC 130, FIG. 8E shows a program SFC 140, and these SFC programs are stored at areas with corresponding program numbers in the SFC program storage area 29 respectively.

The program SFC 100 executes G100 in step S1 and determines whether conditions for shifting have been established or not. When it is determined that the conditions for shifting have been established, system control shifts to step S2 to start execution of the program K100, and terminates execution of the SFC program. Herein, in step S2, only the processing for starting execution of the program K100 is executed, and execution of the SFC program is terminated without waiting for completion of positioning. When it is determined in step S1 that the conditions for shifting have not been established, system control does not shift to step S2, but leaves the SFC program, and restarts execution of the SFC program from step S1 when executed next time.

The program SFC 110 executes G110 in step S11, and determines whether conditions for shifting have been established or not. If it is determined that the conditions for shifting have been established, system control shifts to step S12, executes F110, and terminates execution of the SFC program. If it is determined in step S11 that the conditions for shifting have not bee established, system control does not shift to step S12, but leaves the SFC program, and restarts execution of the SFC program from step S11 when executed next time.

The program SFC 120 executes G120 in step S21, and determines whether conditions for shifting have been established or not. If it is determined that the conditions for shifting have been established, system control shifts to step S22 to execute the program F120, and terminates executes of the SFC program. If it is determined in step S21 that the conditions for shifting have not been established, system control does not shift to step S22, but leaves the SFC program, and restarts execution of the SFC program from step S21 when executed next time.

The program SFC 130 executes G130 in step S31, and determines whether conditions for shifting have been established or not. If it is determined that the conditions for shifting have been established, system control shifts to step S32 to start the program K130, and terminates execution of the SFC program. If it is determined in step S31 that the conditions for shifting have not been established, system control does not shift to step S32, but leaves the SFC program, and restarts execution of the SFC program from step S31 when executed next time.

The program SFC 140 executes G140 in step S41, and determines whether conditions for shifting have been established or not. If it is determined that the conditions for shifting have been established, system control shifts to step S42 to start execution of the program F140, and terminates execution of the SFC program. If it is determined in step S41 that the conditions for shifting have not been established, system control does not shift to step S42, but leaves the SFC program, and restarts execution of the SFC program from step S41 when executed next time.

Figure 9A:
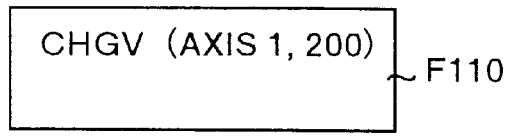
FIGS. 9A to 9C are explanatory views showing computing control program setting.
Figure 9B:
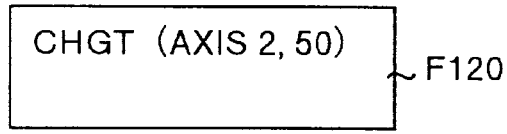
Figure 9C:
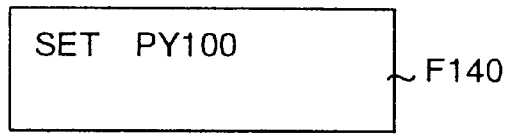

Examples of setting of the computing control program are shown in FIG. 9A to FIG. 9C. FIG. 9A shows a program F110 with the program number 110, FIG. 9B shows a program F120, and FIG. 9C shows a program F140, and the programs are stored at areas with corresponding program numbers in the F program storage area 30 in the event processing program memory 13 respectively.

The program F110 is an F program for changing a running speed of the axis 1 under positioning control to 200, program F120 is an F program for changing a torque limit value of the axis 2 to 50% of the original value, and program F140 is an F program for setting PY100. Herein PY100 indicates an output signal from the output unit 17 connected to the servo control section 3 with a parameter name, and this parameter name can be differentiated from the output signal Y100 from the output unit 9 connected to the sequence control section 2 because P is added to the header.

Figure 10A:
FIGS. 10A to 10E are explanatory views showing transition program setting.
Figure 10B:
Figure 10C:
Figure 10D:
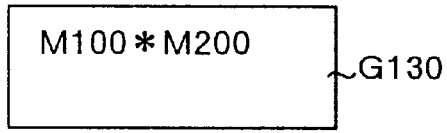
Figure 10E:
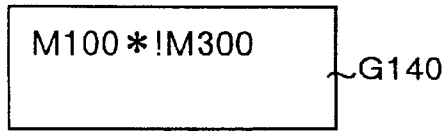

Examples of setting of a transition program are shown in FIG. 10A to FIG. 10E. FIG. 10A shows a program G100 with program number 100, FIG. 10B shows a program G110, FIG. 10C shows a program G120, FIG. 10D shows a program G130, FIG. 10E shows a program G140, and the programs are stored at areas with corresponding program numbers of the G program storage area 31 in the event processing program memory 13 respectively.

The program G100 is a G program for determining whether conditions for shifting have been established or not by computing a logical product between M100 and M200. When both M100 and M200 are ON, it is determined that the conditions for shifting have been established. Herein the M100 and M200 are internal relays each used for sequence control, and can freely read or write data from and in an SSC because device information is stored in the common memory 22, and are used, for instance, to determine whether a servo program is ready for start or not.

The program G110 is a G program for determining whether conditions for shifting have been established or not by checking whether the M2001 is ON or not. When the M2001 is ON, it is determined that the conditions for shifting have been established.

The program G120 is a G program for determining whether conditions for shifting have been established or not by checking whether the M2002 is ON or not. When the M2002 is ON, it is determined that the conditions for shifting have been established.

The program G130 is a G program for determining whether conditions for shifting have been established or not by computing a logical product between M100 and M200. When both M100 and M200 are ON, it is determined that the conditions for shifting have been established.

The program G140 is a G program for determining whether conditions for shifting have been established or not by computing a logical product between M100 and M300. When the M100 is ON and M300 is OFF, it is determined that the conditions for shifting have been established.

Next description is made for an operation for starting execution of a servo program at a first transition when an input signal PX0 from the input unit 16 is turned ON in the servo control section 3. When the input signal PX0 is turned ON at the timing shown at the rising edge Ja of the input signal in FIG. 5J, the event detecting section 19 generates a pulse in an input event signal. This rising edge Da is reflected by the interruption control circuit 20 to an interruption control signal as a rising edge Eb, and event processing is executed at the timing indicated by the sign Ia in FIG. 5I upon interruption processing by the CPU 10 for positioning control.

The event processing executed by the CPU 10 for positional control can also be executed as independent interruption processing each event factor, and also can be executed by determining a factor during execution of one interruption program and branching to processing for each event factor. In any case, an SFC program having a program number corresponding to each event is read out from the SFC program storage area 29 and executed by referring to the successive shift number storage area 25 and event 1 information storage area 26₁ to event n information storage area 26ₙ in the event processing parameter storage area 23.

In an example of storage in this embodiment, the SFC program with the program number 100 is read out and executed by referring to the event 1 information shown in FIG. 7.

As shown in FIG. 8A, the program SFC 100 executes G100 shown in FIG. 10A in step S1, and system control shifts to step S2 when conditions for shifting have been established with the program K100 shown in FIG. 6A started. The successive shift number stored in the successive shift number storage area 25 indicates a limit of times of the shifting operations described above, but the program SFC 100 is terminated when shifted once for the successive shift number 2 in this example of setting, so that any specific limiting operation is not executed.

During the event processing executed upon execution of the interruption indicated by the sign Ia in FIG. 5I, a program number 100 is set in the start program number storage area 36 for servo starting information stored in the control memory 11 (Refer to FIG. 4), and when only information for instructing start of a servo program is set in the starting information storage area 35, execution of the SFC program is terminated and processing for interruption is finished.

Then in the servo control computing processing indicated by the sign Gb in FIG. 5G, a servo program with a program number 100 is read out and started by referring to starting information in the starting information storage area 35 in the control memory 11 as well as to the start program number in the start program number storage area 36.

As shown in FIGS. 6A to 6C, the program K100 is a program based on the absolute system for 2-axis linear interpolation control, and computes so that the axis 1 is positioned at address 10000 and axis 2 at address 20000 with a synthesized speed 100, and writes a result of computing in the servo interface 14 through the servo control data read/write processing indicated by the sign Fc shown in FIG. 5F.

The servo interface 14 communicates with the servo system 21 for delivery of servo control data independently from the processing by the CPU 10 for positioning control. When this instruction is received, a servo motor in the servo system 21 starts a positioning operation. With the operation as described above, a response time from input of the signal PX0 until transmission of servo control data to the servo system is at maximum 3 cycles of the control cycle clock 18, and nonuniformity of the response time is suppressed to one cycle. Herein one cycle of the control cycle clock 18 is normally in a range from 0.5 ms to 5 ms, and this value is in a range from 1/10 to 1/100 of a scan time in the sequence control section 2.

Next description is made for an operation when a rotational speed of a servo motor is changed at a first transition when the input signal PX1 is turned ON. When the input signal PX1 is turned ON at the timing shown at the rising edge Ja of the input signal shown in FIG. 5J, like in a case of the input signal PX0, event processing is executed at the timing indicated by the sign Ia in FIG. 5I upon interruption by the CPU 10 for positioning control. Herein, the SFC program with program number 110 is read out and executed by referring to the event 2 information shown in FIG. 7.

As shown in FIG. 8B, the program SFC 110 executes G110 shown in FIG. 10B in step S21, and if it is determined that conditions for shifting have been established, system control shifts to step S21 with F110 shown in FIG. 9A executed.

During the event processing executed upon interruption indicated by the sign Ia in FIG. 5I, an axis number 1 is set in a speed-changed axis number storage area 38 for the servo starting information stored in the control memory 11, a speed change value 200 is set in a speed change value storage area 39, formation for instructing speed change is set in the starting information storage area 35, and then execution of the SFC program is terminated with the interruption processing finished.

Then, in the servo control computing processing indicated by the sign Gb in FIG. 5G, computing for servo control data is executed by referring to starting information in the starting information storage area 35, a speed-changed axis in the speed-changed axis storage area 38 and also to a speed change value in the speed change value storage area 39 each in the control memory 11 so that a control speed for 1 axis is 200, and a result of computing is written in the servo interface 14 through the servo control data read/write processing indicated by the sign Fc in FIG. 5F.

The servo interface 14 communicates with the servo system 21 for delivery of servo control data independently from the processing by the CPU 10 for positioning control at the timing indicated by the sign Bc in FIG. 5B. When this instruction is received, change of a rotational speed of the servo motor in the servo system 21 is started. With the operation as described above, like in a case of starting a servo program, a response time from input of the input signal PX1 until transmission of servo control data to the servo system 21 is at maximum 3 cycles of the control cycle clock 18, and nonuniformity of the response time is suppressed to one cycle.

Next description is made for an operation for changing a torque limit value for a servo motor at a first transition when an input signal PX2 is turned ON. When the input signal PX2 is turned ON at the timing indicated by the rising edge Ja of the input signal in FIG. 5J, like in a case of the input signal PX0, event processing is executed at the timing indicated by the sign Ia in FIG. 5I upon interruption by the CPU 10 for positioning control. Herein, the SFC program with program number 120 is read out and executed by referring to the event 3 information in FIG. 7.

As shown in FIG. 8C, the program SFC 120 executes G120 shown in FIG. 10C in step S21, and if it is determined that conditions for shifting have been established, system control shifts to step S22 with F120 shown in FIG. 9B executed.

During the event processing executed upon interruption indicated by the sign Ia in FIG. 5I, the axis number 2 is set in the torque limit changed-axis number storage area 40 (Refer to FIG. 4) for servo starting information in the control memory 11, a torque limit change value 50 is set in the torque limit change value storage area 41, information for instructing change of a torque limit is set in the starting information storage area 35, and then execution of the SFC program is terminated with the interruption processing finished.

Then in the servo control computing processing indicated by the sign Gb in FIG. 5G, servo control data is set so that the 2-axis torque limit value is 50 by referring to starting information in the starting information storage area, a speed-changed axis in the speed-changed axis storage area 38, and also to a speed change value in the speed change value storage area 39 each in the control memory 11, and the servo control data is written in the servo interface 14 through the servo control data read/write processing indicated by the sign Fc in FIG. 5F.

The servo interface communicates with the servo system 21 for delivery of servo control data independently from the processing by the CPU 10 for positioning control at the timing indicated by the sign Bc in FIG. 5B. When this instruction is received, a torque limit value for a servo motor in the servo system 21 is changed and control is started.

With the operation as described above, like in a case of starting a servo program, a response time from input of the input signal PX2 until transmission of servo control data to the servo system 21 is at maximum 3 cycles of the control cycle clock 18, and nonuniformity of the response time is suppressed to one cycle.

Next description is made for operations for cancel/start controls executed when a K program currently being executed is terminated at a first transition of an input signal PX3 when the signal is turned ON and execution of a specified K program is started. When the input signal PX3 is turned ON at the rising edge Ja of the input signal in FIG. 5J during execution of servo control with a K100 program by turning ON the input signal PX0 as described above, like in a case of the input signal PX0, event processing is executed at the timing indicated by the sign Ia in FIG. 5I upon interruption by the CPU 10 for positioning control. Herein an SFC program with program number 130 is read out and executed by referring to the event 4 information shown in FIG. 7.

As show in FIG. 8D, the program SFC 130 executes G130 in step S31 as shown in FIG. 10D, and when it is determined that conditions for shifting have been established, system control shifts to step S32 and the program K130 shown in FIG. 6B is executed.

During the event processing executed upon interruption indicated by the sign Ia in FIG. 5I, a program number 200 is set in the start program number storage area 36 for servo starting information 34 in the control memory 11, a program number 100 is set in the cancel program number storage area 37, information for instructing cancel/start is set in the starting information storage area 35, and then execution of the SFC program is terminated with the interruption processing finished.

Then in the servo control computing processing indicated by the sign Gb in FIG. 5G, execution of the K100 program is terminated with the program K200 started by referring to starting information in the starting information storage area 35, a start program number in the start program number storage area 36, and cancel program number in the cancel program number storage area 37 each in the control memory 11, computing of servo control data transmitting to the servo system 21 is executed, and a result of computing is written through the servo control data read/write processing indicated by the sign Fc in FIG. 5F.

The servo interface 14 communicates with the servo system 21 for delivery of servo control data independently from the processing by the CPU 10 for positioning control at the timing indicated by the sign Bc in FIG. 5B. When this instruction is received, the servo motor of the servo system 21 terminates controls with the program K100, and starts controls with the program K200.

With the operations as described above, like in a case where a servo program is started, a response time from input of the input signal PX3 until transmission of the servo control data to the servo system is 3 cycles of the control cycle clock 18, and nonuniformity of the response is suppressed to one cycle.

Next description is made for a case where an input signal PY 100 is turned ON at the first transition when an input signal PX4 is turned ON. When the input signal PX4 is turned ON at the timing indicated in the rising edge Ja of the input signal in FIG. 5J, like in a case of the input signal PX0, event processing is executed at the timing indicated by the sign Ia in FIG. 5I upon interruption by the CPU 10 for positioning control. Herein the SFC program with program number 140 is read out and executed by referring to the event 5 information shown in FIG. 7.

As shown in FIG. 8E, the program SFC 140 executes G140 shown in FIG. 10E in step S41, and when it is determined that conditions for shifting have been established, system control shifts to step S42 and the program F140 shown in FIG. 9C is executed.

PY 100 in the output unit 17 is turned ON via the I/O interface 15 during execution of the event processing executed upon interruption indicated by the sign Ia in FIG. 5I. A point of time when the signal PY 100 is turned ON is timing for a rising edge Ka of the output signal shown in FIG. 5K.

With the operations as described above, a response time from input of the input signal PX4 until output of the output signal PY 100 and nonuniformity of the response time are suppressed to at maximum the time required for the event processing indicated by the sign Ia in FIG. 5I.

It should be noted that description was made for positioning control in the embodiment described above, but the event processing can be applied not only to the positioning control but also to other types of control.

Figure 11:
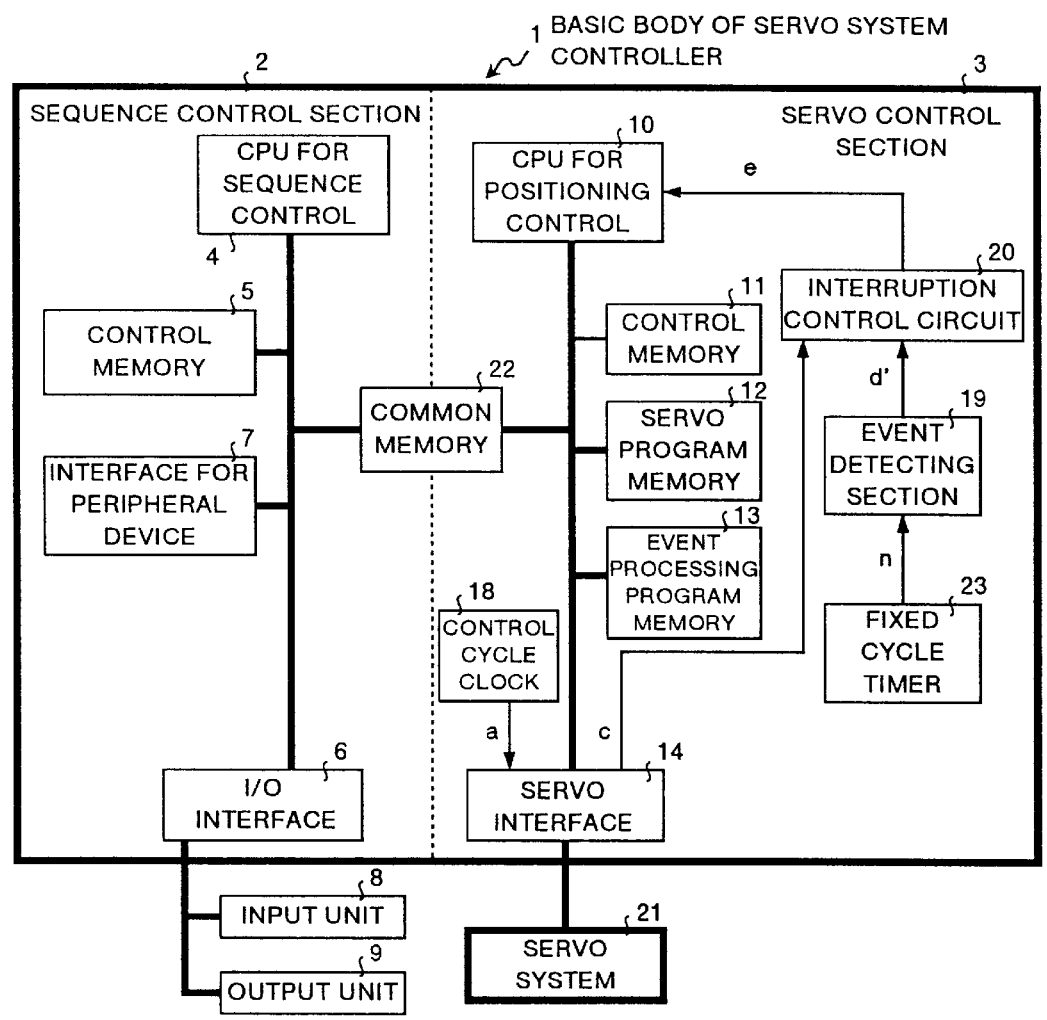
FIG. 11 is a block diagram showing Embodiment 2 of the servo system controller according to the present invention.

FIG. 11 shows configuration in Embodiment 2 of the SSC according to the present invention. It should be noted that the same reference numerals are assigned in FIG. 11 to the same components as those shown in FIG. 1 and detailed description thereof is omitted herein.

In this embodiment, a fixed cycle timer 23 is provided. The fixed cycle timer 23 outputs a timer signal with a fixed cycle different from that of a control cycle clock signal to the event detecting section 19.

The event detecting section 19 receives a timer signal from the fixed cycle timer 23, and sends a fixed cycle event signal synchronized to a first transition edge of the timer signal via the interruption control circuit 20 to the CPU 10 for positioning control to report generation of interruption thereto.

The interruption control circuit 20 receives a control cycle signal from the servo interface 14 to give an interruption control signal for reading or writing servo control data to the CPU 10 for positioning control, and in addition receives a fixed cycle event signal from the event detecting section 19 to give an interruption control signal for event processing synchronized to a rising edge of the fixed cycle event signal to the CPU 10 for positioning control.

With this configuration, an event processing program is executed at a fixed cycle upon interruption by the servo control section 3.

It should be noted that memory configuration of the servo program memory 12 and that of the event processing program memory 13 are the same as those in Embodiment 1 shown in FIG. 2 and FIG. 3.

Figure 12:
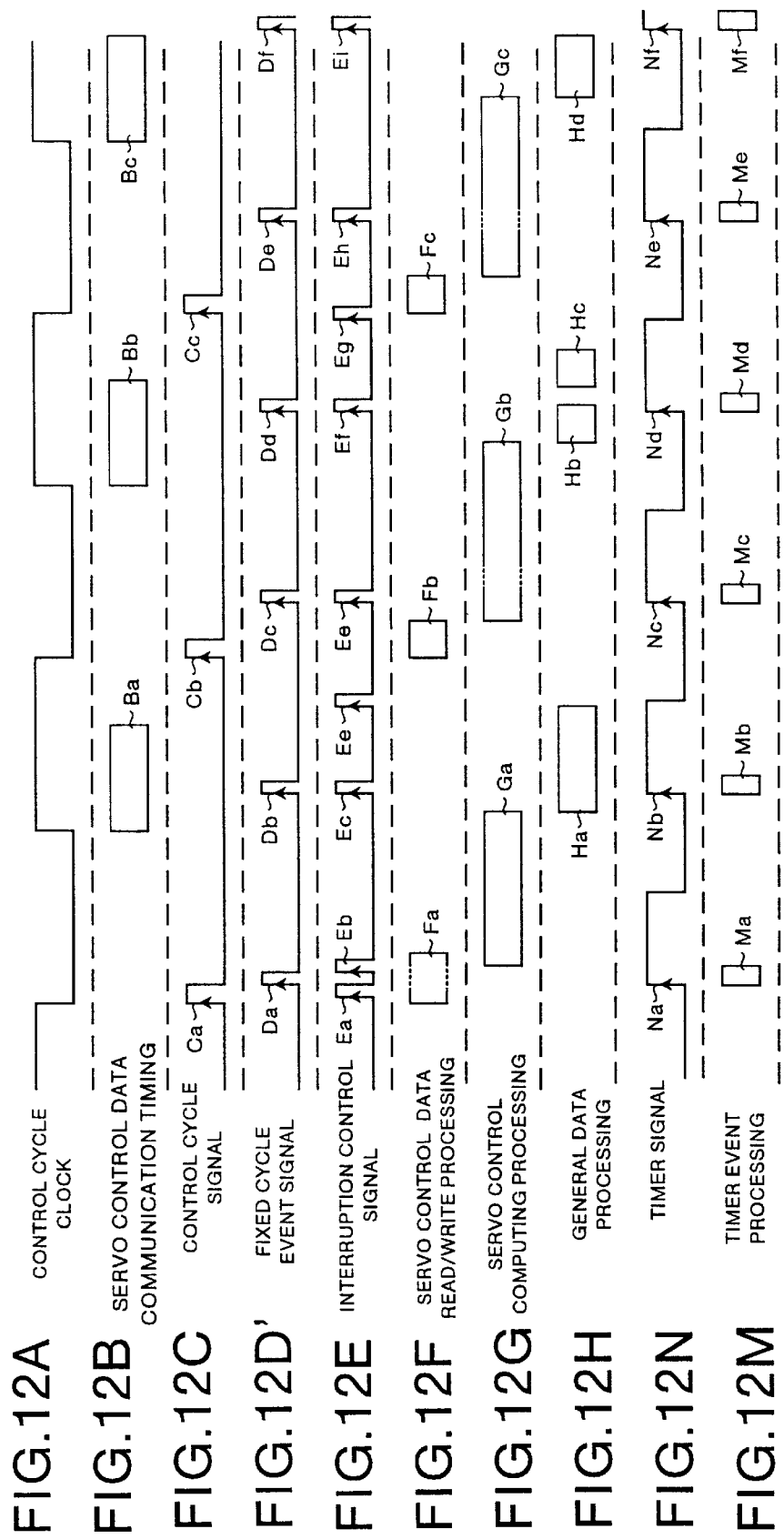
FIGS. 12A to 12C, FIG. 12D'.
FIGS. 12E to 12H, FIG. 12N and FIG. 12M are timing charts for execution of event processing in the servo system controller in Embodiment 2.

FIGS. 12A to 12D', FIG. 12E to FIG. 12H, FIG. 12N, and FIG. 12M are timing charts each showing operating timing for the servo control section 3. FIGS. 12A to 12C and FIGS. 12F to 12G are the same as those relating to Embodiment 1 shown in FIGS. 5A to 5C and FIGS. 5F to 5G, so that description thereof is omitted herein. FIG. 12D' shows a waveform of a fixed cycle event signal generated by the event detecting section 19 in response to an input signal from the fixed cycle timer 23, and Da to Df each show the rising edge.

FIG. 12E shows a waveform of an interruption control signal inputted into the CPU 10 for positioning control from the interruption control circuit 20, and Ea to Ei each show the rising edge. Of these rising edges, Ea, Ed, and Eg are synchronous to rising edges Ca to Cc of the control cycle signal respectively, while Eb, Ec, Ee, Ef, Eh, and Ei are synchronous to a rising edge of the fixed cycle event signal.

FIG. 12N shows a waveform of a timer signal inputted from the fixed cycle timer 23 to the event detecting section 19, and Na to Nf each show a rising edge of a timer signal.

FIG. 12M shows timing for the timer event processing executed upon interruption by the CPU 10 for positioning control in synchronism to a first transition of an interruption control signal according to a fixed cycle event signal, and timer event processing Ma to Mf are synchronous to rising edges Da to Df of the fixed cycle event signal respectively.

Next description is made for operations of the servo control section 3. Also in this embodiment, a servo program and an event processing program are previously stored by a user via the I/O interface 6 and common memory 22 in the servo program memory 12 and the event processing program memory 13 respectively.

FIG. 13 shows an example of setting of event processing parameters stored in the event processing parameter storage area 23 in the event processing program memory 13. Event 1 information (event factor, program number) is stored in corresponding areas of event 1 information storage area $26_1$ to event n information storage area $26_n$ in the event processing parameter storage area 23 in the event processing program memory 13. Herein the event 1 information indicates setting for starting the SFC program (SFC 200) with program number 200 at a rising edge of the timer. In this example of setting, a successive shift number 2 is stored in the successive shift number storage area 25.

Figure 14:
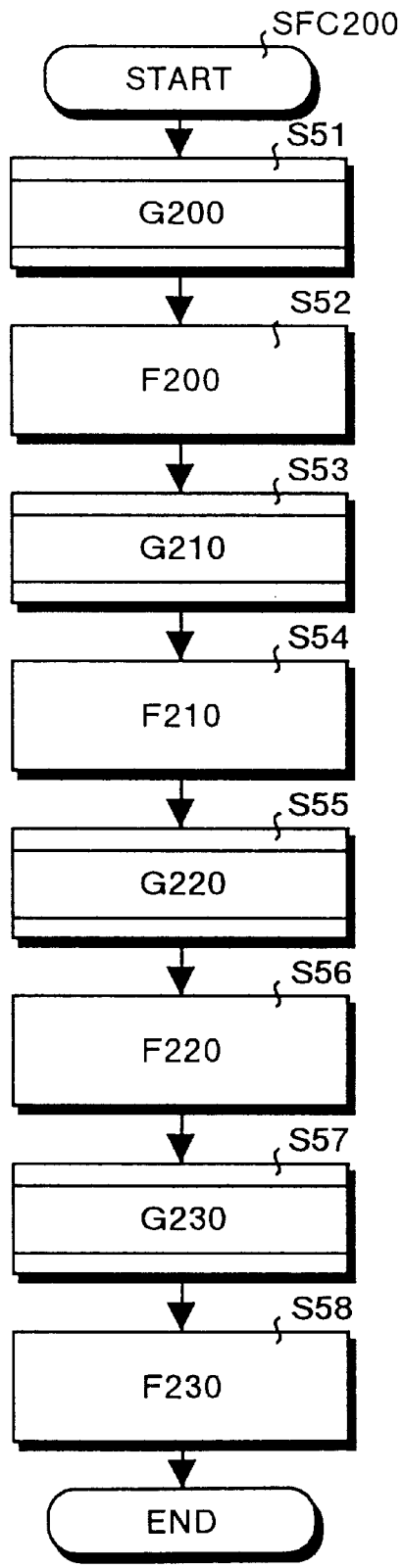
FIG. 14 is an explanatory view showing SFC program setting.

FIG. 14 shows an example of setting of the SFC program (SFC 200) with program number 200. This SFC program is stored in an area with a corresponding program number in the SFC program storage area 29 in the event processing program memory 13.

The program SFC 200 executes G200 in step S51, and determines whether conditions for shifting have been established or not. If it is determined that the conditions for shifting have not been established, system control does not shift to step S52, and leaves the SFC program, and execution of the SFC program is restarted from step S51 when executed next.

If it is determined that the conditions for shifting have been established, system control shifts to step S52 with the program F200 executed. Then G210 is executed in step S53 and determination is made as to whether the conditions for shifting have been established or not. Like in step S51, if it is determined that the conditions for shifting have not been established, system control does not shift to step S54, and leaves the SFC program, and execution of the SFC program is restarted from step S53 when executed next. If it is determined that the conditions for shifting have been established, system control shifts to step S54 with F210 executed. Also in step S55 and step S57, like in step S51 and step S53 described above, G220 and G230 are executed to shift to step S56 and step S58 with F220 and F230 executed respectively, and execution of the SFC program is terminated.

As described above, times of shifting from a G program to an F program is defined herein as times of shifting. In SFC 200, a shift number is 4.

Figure 15A:
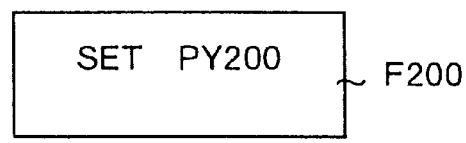
FIGS. 15A to 15D are explanatory views showing computing control program setting.
Figure 15B:
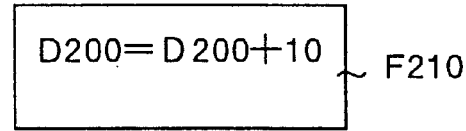
Figure 15C:
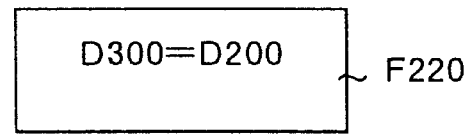
Figure 15D:
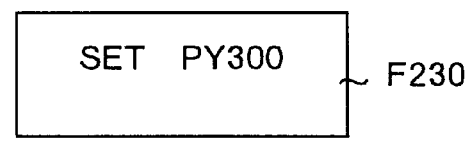

FIGS. 15A to 15D each show an example of setting of a computing control program. FIG. 15A shows a program F200 with program number 200, FIG. 15B shows a program F210, FIG. 15C shows a program F220, and FIG. 15D shows a program F230, and these computing control programs are stored at areas with corresponding program numbers in the F program storage area 30 in the event processing program memory 13 respectively.

The program F200 is a program for setting PY 200. The program F210 is a program for reading a data value stored in D200 and writing a result of adding 10 to the data value in D200. Herein D200 indicates a data register used for sequence control, and as device information is stored in the common memory 22, the data register D200 can freely read or write data from and in the servo control section 3, and the device information can also be used as a parameter in the computing control program. The program F220 is a program for reading a data value stored in D200 and writing the data value in D300. The program F230 is a program for setting PY 300.

Figure 16A:
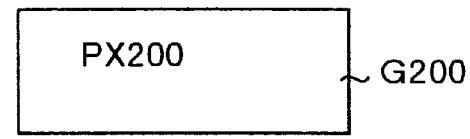
FIGS. 16A to 16D are explanatory views showing transition program setting.
Figure 16B:
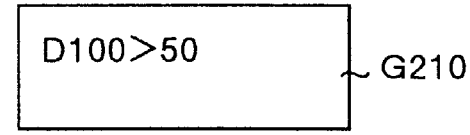
Figure 16C:
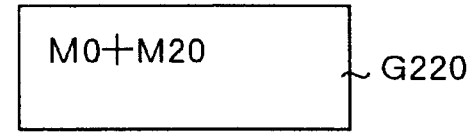
Figure 16D:
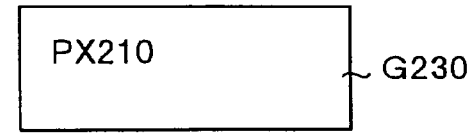

FIG. 16A to FIG. 16D each show an example of setting of a transition program. FIG. 16A is a program G200 with program number 200, FIG. 16B shows a program G210, FIG. 16C shows a program G220, and FIG. 16D shows a program G230, and these transition programs are stored at areas with corresponding program numbers in the G program storage area 31 in the event processing program memory 13 respectively.

The program G200 is a G program for checking whether PX 200 is ON or not and also for determining conditions for shifting. When PX 200 is ON, it is determined that conditions for shifting have been established. The program G210 is a program for making comparison as to whether D100 is larger than 50 or not and determining conditions for shifting. When D100 is larger than 50, it is determined that the conditions for shifting have been established. The program G220 is a G program for computing a logical sum of M0 and M20 and determining conditions for shifting. When either one of M0 or M20 is ON, it is determined that the conditions for shifting have been established. The program G230 is a G program for checking whether PX 210 is ON or not and determining conditions for shifting. When PX 210 is ON, it is determined that the conditions for shifting have been established.

Next description is made for operations for executing a timer event in the servo control section 3. Interruption is generated in the CPU 10 for positioning control at the first transition edge Da of the fixed event signal shown in FIG. 12D' generated at the rising edge Na of the timer signal shown in FIG. 12N, and the timer event is executed at the timing indicated by the timer event processing Ma in FIG. 12M.

In the timer event processing, an SFC program with a corresponding program number is read out from the SFC program storage area 29 and executed by referring to the successive shift number storage area 25 as well as to the event 1 information storage area 26 to event n information storage area 28 each in the event processing parameter storage area 23 in the event processing program memory 13. In examples of storage in this embodiment, the SFC program with program number 200 is read out and executed by referring to the event 1 information shown in FIG. 13.

As shown in FIG. 14, the program SFC 200 executes G200 shown in FIG. 16A in step S51, and when it is determined that conditions for shifting have been established, system control shifts to step S52, and F200 shown in FIG. 15A is executed.

Then G210 is executed in step S53, and if it is determined that conditions for shifting have been established, system control shifts to step S54 with F210 executed. The successive shift number stored in the successive shift number storage area 25 limits times of the shifting operation described above, and as the successive number in this example of setting is 2, so that, after step S54 is executed, system control once leaves the timer event processing, and execution of the program SFC 200 is restarted from step S55 at the timing indicated by the next timer event processing Mb.

As described above, by limiting times of shifting operation in one event processing, it becomes possible to limit a time when event processing occupies the CPU 10 for positioning control and the CPU 10 can be prevented from being occupied by event processing for an excessively long period of time without damaging the characteristics of servo control as a real time operation.

In the timer event processing executed at the timing indicated by the timer event processing Mb in FIG. 12M, when execution of the program is started from step S55 in SFC 200, if it is determined that conditions for shifting to G220 have not been established, system control once leaves the timer event processing, and restarts execution of the program SFC 200 from step S55 at the timing indicated by the next timer event processing Mc.

With this operation, it is possible to repeatedly sample particular conditions for shifting at a specified timer cycle to determine them. If a programmable timer making it possible to change a timer cycle with the CPU 10 for positioning control is used, it is possible to determine the conditions for shifting at an arbitrary fixed cycle.

In the timer event processing executed at the timing indicated by the timer event processing Mc in FIG. 12M, when execution of the program SFC 200 is started from step S55, if it is determined that conditions for shifting to G220 have been established, system control shifts to step S16 and F220 is executed. Then G230 is executed in step S57, and if it is determined that the conditions for shifting have been established, system control shifts to step S58 to execute F230, and then terminates execution of the program SFC 200.

Also in this embodiment, description was made for single timer event processing executed at the same timing as a timer cycle of the fixed cycle timer 23, the configuration is not limited to that described above, and the configuration is allowable where a plurality of timer event processings each executed at a timing of a cycle an integral number times longer than a timer cycle of the fixed cycle timer 23 are executed.

Figure 17:
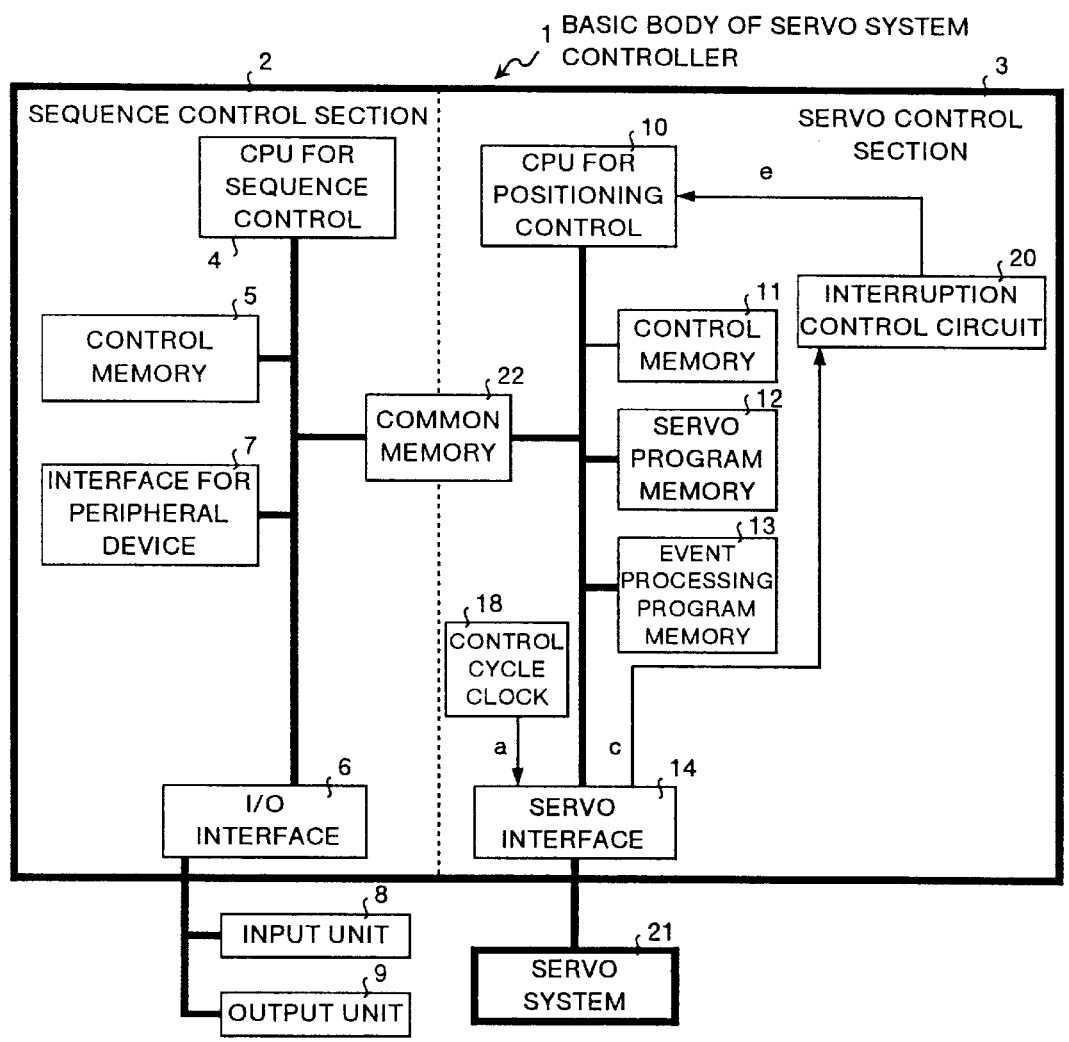
FIG. 17 is a block diagram showing Embodiment 3 of the servo system controller according to the present invention.

FIG. 17 shows Embodiment 3 of the SSC according to the present invention. It should be noted that the same reference numerals are assigned to the same components in FIG. 17 as those in FIG. 1 and detailed description thereof is omitted herein.

In this embodiment, the CPU 10 for positioning control executes event processing in response to interruption synchronous to a rising edge of a control cycle signal generated by the servo interface 14. For this reason, the servo control data read/write processing is executed in response to interruption synchronous to a rising edge of a control cycle signal, and when this servo control data read/write processing is complete, then the control cycle event processing is executed as interruption.

Also in this embodiment, memory configuration of the servo program memory 12 and that of the event processing program memory 13 are the same as those in Embodiment 1 shown in FIG. 2 and FIG. 3.

Figure 18:
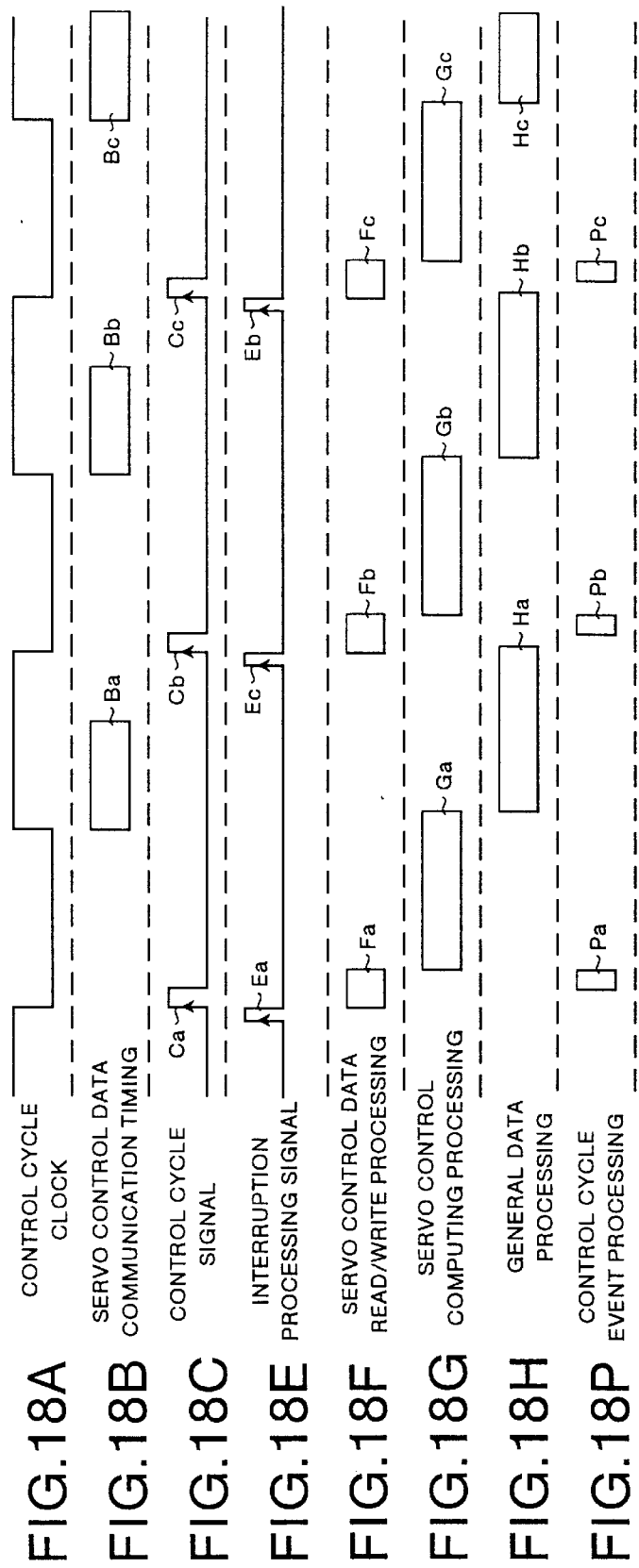
FIGS. 18A to 18C, FIGS. 18E to 18H and FIG. 18P are timing charts for execution of event processing in the servo system controller in Embodiment 3.

FIGS. 18A to 18C, FIGS. 18E to 18H, and FIG. 18P are timing charts each showing operating timing for the servo control section 3. FIGS. 18A to 18C, and FIGS. 18E to 18H are the same as those relating to Embodiment 1 shown in FIGS. 5A to 5C and FIGS. 5E to 5H, so that description thereof is omitted herein. FIG. 18P shows timing for control cycle event processing, and Pa to Pc are executed during interruption synchronous to rising edges Ca to Cc of the control cycle signal waveform respectively.

During interruption synchronous to the rising edge of the control cycle signal waveform, the servo control data read/write processing is executed with priority at the timings of Fa to Fc, and then the control cycle event processing is executed at the timings of Pa to Pc. After the operation is returned from the processing for interruption, the servo control computing processing is executed at the timings of Ga to Gc.

Next description is made for operations of the servo control section 3. Also in this embodiment, a servo program and an event processing program are previously stored by a user via the I/O interface 6 and common memory 22 in the servo program memory 12 and event processing program memory 13 respectively.

Figures 19, 20:
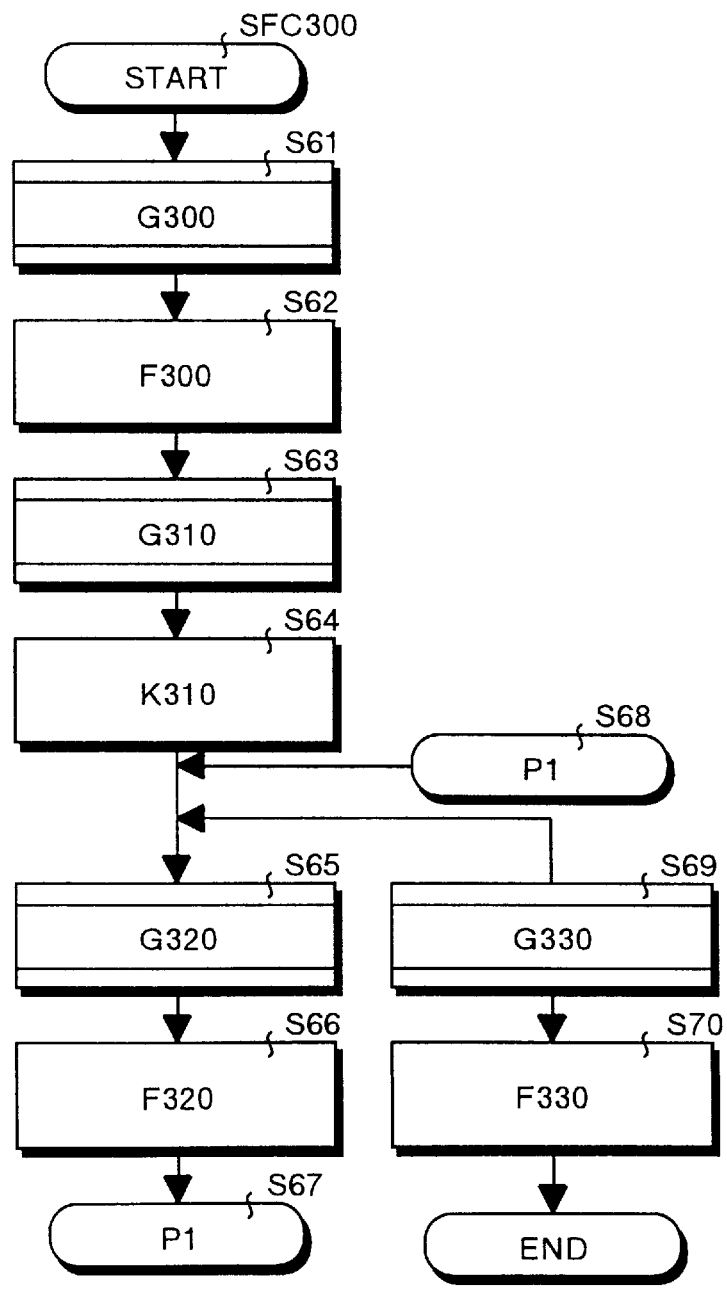
FIG. 19 is an explanatory view showing event processing parameter setting.
FIG. 20 is an explanatory view showing SFC program setting.

FIG. 19 shows an example of setting of event processing parameters stored in the event processing parameter storage area 23 in the event processing program memory 13. The event 1 information (event factor, program number) are stored at a corresponding area of the event 1 information storage area $26_1$ to event n information storage area $26_n$ of the event processing parameter storage area 23 in the event processing program memory 13. The event 1 information here indicates setting for starting an SFC program with program number 300 at a servo control cycle synchronized to a rising edge of a control cycle signal 44. Also in this example of setting, a successive shift number of 1 is stored in the successive shift number storage area 25.

FIG. 20 shows an example of setting of the SFC program (SFC 300) with program number 300. This SFC program is stored at an area with a corresponding program number of the SFC program storage area 29 in the event processing program memory 13.

The program SFC 300 executes G300 in step S61 and determines whether conditions for shifting have been established or not. If it is determined that the conditions for shifting have not been established, system control does not shifts to step S62 and leaves the SFC program, and restarts execution of the SFC program from step S61 when executed next time. If it is determined that the conditions for shifting have been established, system control shifts to step S62 and executes the program F300. Then in step S63, G130 is executed, and determination is made as to whether the conditions for shifting have been established or not. Like in step S61, if it is determined that the conditions for shifting have not been established, system control leaves the SFC program, and restarts execution of the SFC program from step S63 when executed next time. If it is determined that the conditions for shifting have been established, system control shifts to step S64 to start execution of the program K310.

Then G320 in step S65 is executed, and if it is determined that the conditions for shifting have been established, system control shifts to step S66 to execute F320, and jumps to a pointer for step S68 by jumping in step S67. If it is determined in step S65 that the conditions for shifting have not been established, G330 is executed in step S69. If it is determined that the conditions for shifting to G330 have been established, system control shifts to step S70, executes F330, and then terminates execution of the program SFC 300. If it is determined that the conditions for shifting have not been established, system control leaves the SFC program, and restarts execution of the SFC program from a step requiring determination as to conditions for shifting in step S65 when executed next time.

Figure 21:
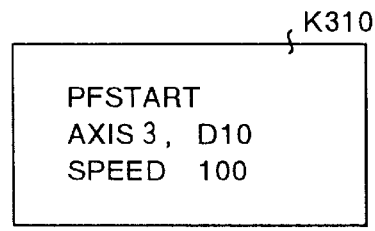
FIG. 21 is an explanatory view showing servo program setting.

FIG. 21 shows an example of setting of a servo program. This servo program is K310 with program number 310, and is stored in an area with a corresponding program number in the K program storage area 33 in the event processing program memory 13. The program K310 is a servo program based on the absolute system for executing 3-shaft position-tracking control. This program provides position-tracking controls over the axis 3 at a speed 100 following addresses specified in D10.

Figure 22A:
FIGS. 22A to 22C are explanatory views showing computing control program setting.
Figure 22B:
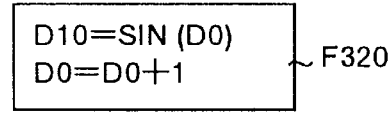
Figure 22C:

FIG. 22A to FIG. 22C each show an example of setting of a computing control program. FIG. 22A shows F310 with program number 310, FIG. 22B shows F320, FIG. 22C shows F330, and these computing control programs are stored at areas with corresponding program numbers in the F program storage area 30 in the event processing program memory 13 respectively. The program F300 is a program for writing 0D10, after writing 1 in D0. The program F320 is a program for reading a data value stored in D0, writing a result of SIN (sinusoidal) computing for the data value in D10, and then writing a result of adding 1 to a value in D0 in D0. The program F330 is a program for writing 0 in D0.

Figure 23A:
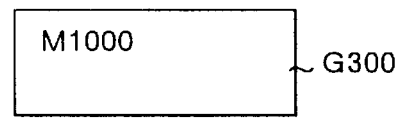
FIGS. 23A to 23D are explanatory views showing transition program setting.
Figure 23B:
Figure 23C:
Figure 23D:
Figure 24:
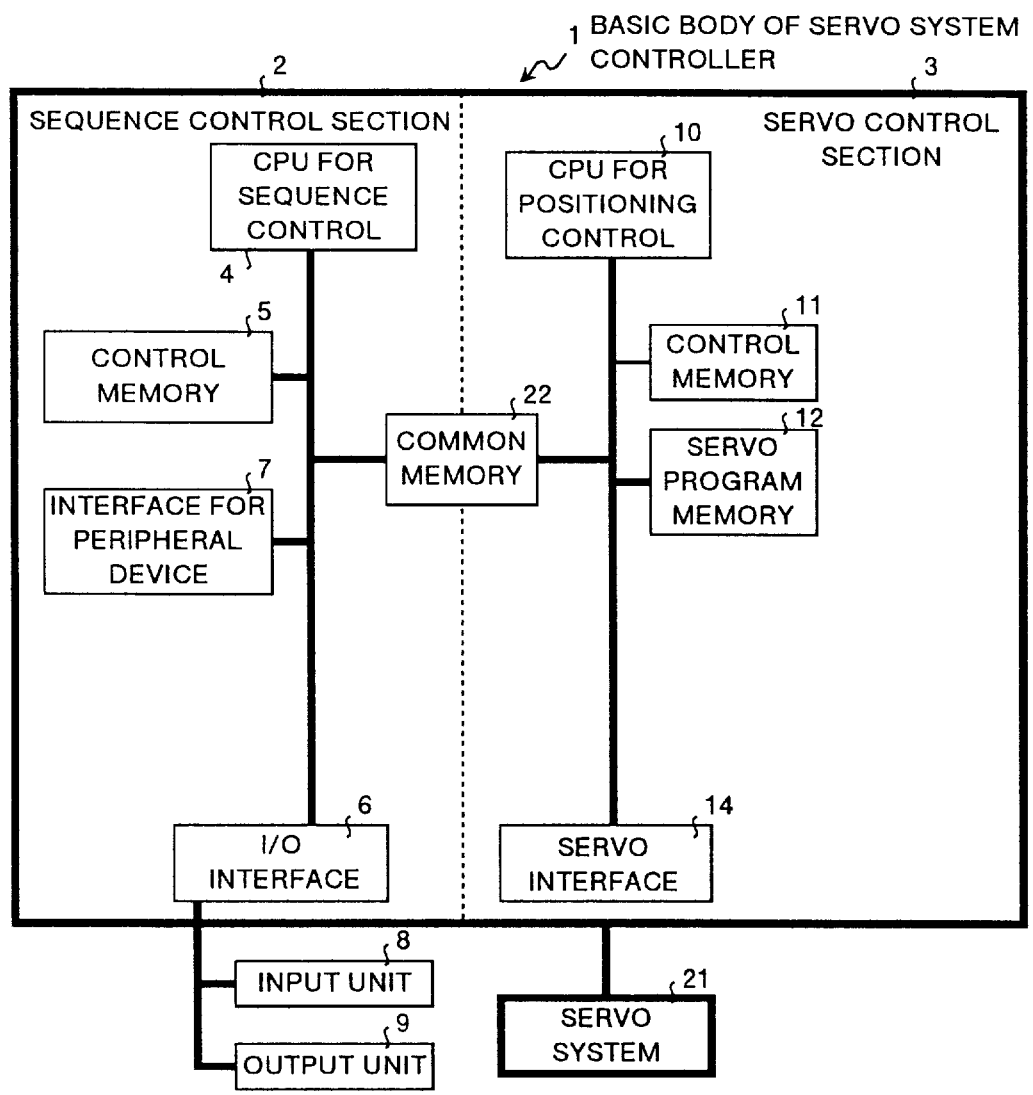
FIG. 24 is an block diagram showing a conventional type of servo system controller.
Figure 25:
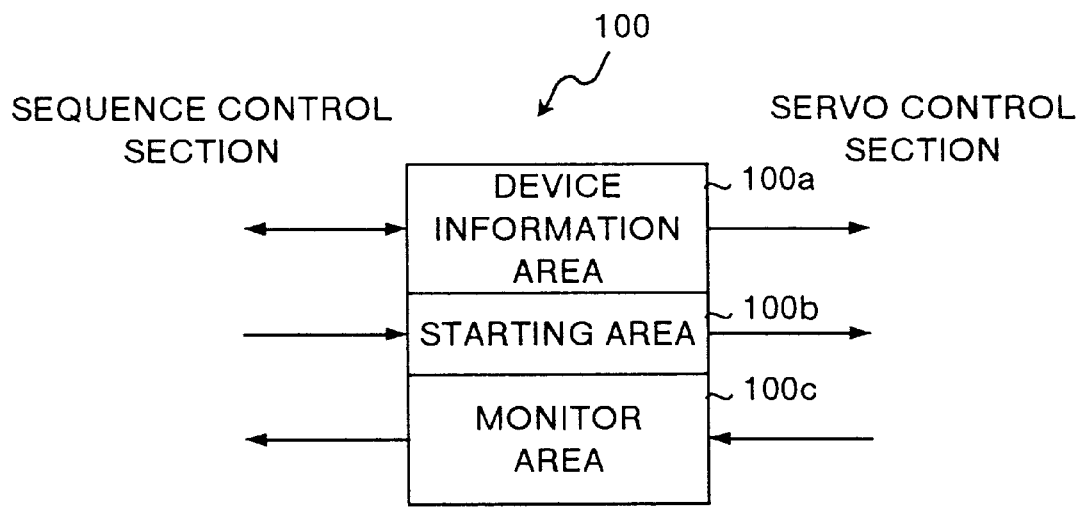
FIG. 25 is a block diagram showing a common memory in FIG. 24.

FIG. 23A to FIG. 23D each show an example of setting of a transition program. FIG. 23A shows a program G300 with program number 300, FIG. 23B shows a program G310, FIG. 23C shows a program G320, FIG. 23D shows a program G330, and these transition programs are stored at areas with corresponding program numbers in the G program storage area 31 in the event processing program memory 13 respectively.

The program G300 is a program for checking whether M1000 is ON or not and determining whether conditions for shifting have been established or not. When M1000 is ON, it is determined that conditions for shifting have been established. The program G310 is a G program for checking whether PX 100 is ON or not and determining conditions for shifting. When PX 100 is ON, it is determined that conditions for shifting have been established. The program G320 is a G program for checking whether M1100 is OFF or not and determining conditions for shifting. When M1100 is OFF, it is determined that conditions for shifting have been established. The program G330 is a G program for checking whether M1100 is ON or not and determining conditions for shifting. When M1100 is ON, it is determined that conditions for shifting have been established.

Next description is made for operations for providing sinusoidal positioning controls over a three-axial servo motor in the servo system 21 through position-tracking control using the control cycle event processing in the servo control section 3.

Interruption is generated in the CPU 10 for positioning control in synchronism to rising edges Ca to Cc of a waveform of the control cycle signal in FIG. 18C, the servo control data read/write processing is executed at the timing indicated by the signs Fa to Fc in FIG. 18F upon interruption, and then successively the control cycle event processing is executed at the timing indicated by the signs Pa to Pc in FIG. 18P. In the control cycle event processing, an SFC program with a corresponding program number is read out from the SFC program storage area 29 and executed by referring to the successive shift number storage area 25 and event 1 information storage area 26 to event n information storage area 28 each of the event processing parameter storage area 23 in the event processing program memory 13. In this embodiment, the SFC program with program number 300 is read out and executed by referring to the event 1 information in FIG. 19.

As shown in FIG. 20, the program SFC 300 executes G300 shown in FIG. 23A in step S61, and if it is determined that conditions for shifting have been established (When M1000 is ON), system control shifts to step S20 to execute F300 shown in FIG. 22A with 1 written in D0 and 0 in D10. 1 is stored in the successive shift number storage area 25 in FIG. 2, and as a shifting operation was executed once from step S61 to step S62, after step S62 is executed once, system control leaves the control cycle event processing.

Next it is assumed that a current point of time is the next control cycle event processing timing Pa. In the control cycle event processing executed at the timing Pa for the control cycle event processing, execution of the program SFC 300 is restarted from step S63, and if it is determined that conditions for shifting have been established after execution of G310 (when PX 100 is ON), system control shifts to step S64 with the program K310 started.

During the control cycle event processing executed at the timing indicated by the sign Pa in FIG. 18P, a program number of 310 is set in the start program number storage area 36 for servo starting information in the control memory 11, and information for instructing start of the servo program is set in the starting information storage area 35. Herein a shifting operation was executed once in a sequence from step S63 to step S64, so that system control once leaves the control cycle event processing.

Next in the servo control computing processing indicated by the sign Ga in FIG. 18G, a servo program with program number 310 is read out and started by referring to the starting information storage area 35 and the start program number storage area 36.

As shown in FIG. 21, the program K310 is a program for position-tracking control, and computes for positioning the axis 3 to the address specified in D0 at a speed 100, and writes a result of computing through the servo control data read/write processing Fb in FIG. 18F. As for the value in D0 at this point of time, 0 is stored by F300 executed in step S62.

The servo interface 14 communicates with the servo system 21 for delivery of servo control data independently from the processing by the CPU 10 for positioning control at the timing indicated by the sign Bb in FIG. 18B, and when this instruction is received, a servo motor in the servo system 21 starts a positioning operation.

Then execution of the control cycle event processing executed at the control cycle event processing timing Pb is restarted from step S65 of the program SFC 300, and after execution of G320, if it is determined that conditions for shifting have been established (M1100; OFF), system control shifts to step S66 to execute F320. In this step, as a value stored in D0 is i, the program F320 writes a result of computing for SIN (1) in D10 and 2 in D0.

Then system control jumps from step S67 to step S68. Herein as a shifting operation was once executed from step S65 to step S66, system control once leaves the control cycle event processing.

Then, in the servo control computing processing indicated by the sign Gb in FIG. 18G, computing is executed so that the axis 3 is positioned at the address specified in D0, and a result of computing is written in the servo interface 14 through the servo control data read/write processing indicated by the sign Fc in FIG. 18F. Then, a result of computing for SIN (1) is stored in D0 by F320 executed in step S24. The servo interface 14 communicates with the servo system 21 for delivery of servo control data independently from the processing by the CPU 10 for positioning control at the timing indicated by the sign Cc in FIG. 18C.

Then in the control cycle event processing executed at the control cycle event processing timing Pc, execution of the program SFC 300 is restarted from step S65 to execute G320, and if it is determined that conditions for shifting have been established (when M1 100 is OFF), system control shifts to step S66 to execute F320. A value stored in D0 in this step is 2, so that in F320, a result of computing for SIN (2) is written in D10, and then 3 is written in D0.

Then instep S67, system control jumps to step 68. Herein as a shifting operation is once executed from step S65 to step S66, system control once leaves the control cycle event processing. By repeating the operation as described above, servo controls can be provided by reflecting a result of computing in step S66 on real time to the servo computing cycle.

In the operation described above, when the control cycle event processing is restarted from step S65 of the program SFC 300, G320 is executed, and if it is determined that conditions for shifting have not been established (when M110 is ON), G330 is executed in step S69, and if it is determined that the conditions for shifting have not been established (when M1100 is ON), system control shifts to step S70 to execute F330. Then 0 is written in D0, and execution of the SFC program is finished.

Description was made above for the signal control cycle event processing executed at the same timing as that of the servo control cycle, but configuration of the present invention is not limited to that described above, and configuration is allowable in which a plurality of control cycle event processing are executed each at a timing larger by an integral number times than the servo control cycle.

As understood from the description above, with the SSC according to the present invention, an event detecting unit provided in the servo control section detects generation of an event in response to input information from an object to be controlled and executes an event processing program stored in an event processing program memory in a servo control section upon interruption by the servo control section according to an output signal from the event detecting unit, so that it is possible to reduce a response time to detection of an event in an object to be controlled, to provide servo controls over the object to be controlled with a fixed response time adjusted to control characteristics of each event, and to realize both improvement of the machining precision and reduction of a tact time without causing cost increase.

With the SSC according to the present invention, an event detecting unit in the servo control section detects generation of a fixed cycle event according to a timer signal outputted from a fixed cycle timer, and executes an event processing program stored in an event processing program memory in the servo control section upon interruption by the servo control section in response to an output signal from the event detecting unit, so that it is possible to realize both reduction of a tact time and improvement of the machining precision by efficiently using capabillities of a CPU in the SSC which can provide controls with an optimal response speed adjusted to a control cycle for each event.

With the SSC according to the present invention, an event processing program stored in an event processing program memory is executed upon interruption by the servo control section at a fixed cycle synchronized to that of the servo control according to information for a control cycle clocks provided in the servo control section, so that, when providing position-tracking controls, it is possible to execute high speed and high precision machining by reflecting a result of computing using an arithmetic function or the like to servo control at the timing synchronous to the servo control cycle.

With the SSC according to the present invention, at first read/write processing for servo control data is executed according to information concerning a control cycle clock, and then after the read/write processing is complete, the event processing program is executed, so that, when providing position-tracking controls, it is possible to execute high speed and high precision machining by reflecting a result of computing using an arithmetic function or the like to servo control at the timing synchronous to the servo control cycle.

With the SSC according to the present invention, an event processing program is executed upon interruption by the servo control section and output information to an object to be controlled is updated, so that it is possible to reduce a response time to detection of an event in an object to be controlled, to control an object to be controlled by updating output information at a fixed response time adjusted to control characteristics of each event, and realize both reduction of a tact time and improvement of the machining precision without causing cost increase.

With the SSC according to the present invention, the servo control section executes only a step or steps in a particular range of an event processing program described in a form of a sequential function chart upon one interruption, so that it is possible to independently describe a control program suited to control characteristics of each event for making the control program easier to understand. Also it is possible to suppress an occupying ratio of a CPU by the servo control section for an event processing so that servo control is not affected by execution of the event processing program.

With the SSC according to the present invention, execution of a positioning program is started when execution of the event processing program is started upon interruption by the servo control section, so that it is possible to reduce and fix a response time when a servo program is started upon detection of an event, and for this reason it is possible to realize both reduction of a tact time and improvement of the machining precision.

With the SSC according to the present invention, a positioning speed is changed during execution of the positioning control by executing the event processing program upon interruption by the servo control section, so that it is possible to reduce and fix a response time when a positioning speed is changed during execution of the positioning control upon detection of an event, and for this reason it is possible to realize both reduction of a tact time and improvement of the machining precision.

With the SSC according to the present invention, the event processing program is executed upon interruption by the servo control section and a torque limit value for a servo motor is changed during execution of servo control, so that it is possible to reduce and fix a response time when a torque limit value is changed during execution of servo control upon detection of an event, and for this reason it is possible to realize both reduction of a tact time and improvement of the machining precision.

With the SSC according to the present invention, when the event processing program is executed upon interruption by the servo control section, a positioning program currently in execution is interrupted and execution of a specified positioning program is stored, so that it is possible to reduce and fix a response time when cancel/start control is carried out upon detection of an event, and for this reason it is possible to realize both reduction of a tact time and improvement of the machining speed.

This application is based on Japanese patent application No. HEI 10-147335 filed in the Japanese Patent Office on May 28, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A servo system controller comprising:
    a servo control section for providing servo controls over an object to be controlled;
    a sequence control section for providing sequence controls over the object to be controlled, by scanning and executing sequence program in which input information from an object to be controlled, internal information, and device information such as output information to the object to be controlled is described with parameters such as a device name and a register number and also by repeating an operation for updating said output information and internal information, via said output information; and
    a dual port memory having a control information area; wherein said servo control section has an event detecting unit for detecting generation of an event according to input information from the object to be controlled and an event processing program memory, and executes an event processing program in said event processing program memory by means of interruption by said servo control section according to an output signal from said event detecting unit.

2. A servo system controller according to claim 1; wherein said servo control section updates output information for an object to be controlled by executing an event processing program in interruption.

3. A servo system controller according to claim 1; wherein said servo control section executes only a step or steps in a particular range of an event processing program described with a sequential function chart only once by interrupting once.

4. A servo system controller according to claim 1; wherein said servo control section starts execution of a positioning program by executing an event processing program in interruption.

5. A servo system controller according to claim 1; wherein said servo control section changes a positioning speed during execution of the processing by executing an event processing program in interruption.

6. A servo system controller according to claim 1; wherein said servo control section changes a torque limit value for a servo motor during execution of the processing by executing an event processing program in interruption.

7. A servo system controller according to claim 1; wherein said servo control section interrupts execution of a positioning program being executed by means of executing an event processing program in interruption and starts execution of a specified positioning program.

8. A servo system controller comprising:
    a servo control section for providing servo controls over an object to be controlled;
    a sequence control section for providing sequence controls over the object to be controlled, by scanning and executing sequence program in which input information from an object to be controlled, internal information, and device information such as output information to the object to be controlled is described with parameters such as a device name and a register number and also by repeating an operation for updating said output information and internal information, via said output information; and
    a dual port memory having a control information area; wherein said servo control section has a fixed cycle timer, an event detecting unit for detecting generation of a fixed cycle event according to a timer signal outputted from said fixed cycle timer and an event processing program memory, and executes an event processing program in said event processing program memory by means of interruption by said servo control section according to an output signal from said event detecting unit.

9. A servo system controller according to claim 8; wherein said servo control section updates output information for an object to be controlled by executing an event processing program in interruption.

10. A servo system controller according to claim 8; wherein said servo control section executes only a step or steps in a particular range of an event processing program described with a sequential function chart only once by interrupting once.

11. A servo system controller according to claim 8; wherein said servo control section starts execution of a positioning program by executing an event processing program in interruption.

12. A servo system controller according to claim 8; wherein said servo control section changes a positioning speed during execution of the processing by executing an event processing program in interruption.

13. A servo system controller according to claim 8; wherein said servo control section changes a torque limit value for a servo motor during execution of the processing by executing an event processing program in interruption.

14. A servo system controller according to claim 8; wherein said servo control section interrupts execution of a positioning program being executed by means of executing an event processing program in interruption and starts execution of a specified positioning program.

15. A servo system controller comprising:
- a servo control section for providing servo controls over an object to be controlled;
- a sequence control section for providing sequence controls over the object to be controlled, by scanning and executing sequence program in which input information from an object to be controlled, internal information, and device information such as output information to the object to be controlled is described with parameters such as a device name and a register number and also by repeating an operation for updating said output information and internal information, via said output information; and
- a dual port memory having a control information area; wherein said servo control section has a control cycle clock for deciding timing for a servo control cycle, and an event processing program memory, and executes an event processing program in said event processing program memory by means of interruption by said servo control section at a fixed cycle synchronized to the servo control cycle according to information from said control cycle clock.

16. A servo system controller according to claim 15 executing at first read/write processing for servo control data and then executing an event processing program in succession to completion of the read/write processing according to information from a control cycle clock.

17. A servo system controller according to claim 15; wherein said servo control section updates output information for an object to be controlled by executing an event processing program in interruption.

18. A servo system controller according to claim 15; wherein said servo control section executes only a step or steps in a particular range of an event processing program described with a sequential function chart only once by interrupting once.

19. A servo system controller according to claim 15; wherein said servo control section starts execution of a positioning program by executing an event processing program in interruption.

20. A servo system controller according to claim 15; wherein said servo control section changes a positioning speed during execution of the processing by executing an event processing program in interruption.

21. A servo system controller according to claim 15; wherein said servo control section changes a torque limit value for a servo motor during execution of the processing by executing an event processing program in interruption.

22. A servo system controller according to claim 15; wherein said servo control section interrupts execution of a positioning program being executed by means of executing an event processing program in interruption and starts execution of a specified positioning program.

* * * * *